(12) United States Patent
Kulewski et al.

(10) Patent No.: US 9,704,231 B1
(45) Date of Patent: Jul. 11, 2017

(54) MEASURING AND VISUALIZING IMPACT OF IMAGE MODIFICATIONS

(71) Applicant: Google Inc., Mountain View, CA (US)

(72) Inventors: Krzysztof Kulewski, Sunnyvale, CA (US); Aravind Krishnaswamy, San Jose, CA (US); Sevket Derin Babacan, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/715,156

(22) Filed: May 18, 2015

Related U.S. Application Data

(60) Provisional application No. 62/000,424, filed on May 19, 2014.

(51) Int. Cl.
*G06T 7/00* (2006.01)
*G06K 9/46* (2006.01)
*G06T 5/50* (2006.01)

(52) U.S. Cl.
CPC .............. *G06T 7/0002* (2013.01); *G06K 9/46* (2013.01); *G06T 5/50* (2013.01); *G06T 2207/10004* (2013.01)

(58) Field of Classification Search
CPC ..................... G06T 7/0002; G06T 5/50; G06T 2207/10004; G06K 9/46

USPC ......................................................... 382/286
See application file for complete search history.

(56) References Cited

U.S. PATENT DOCUMENTS

| | | | |
|---|---|---|---|
| 5,388,197 A | 2/1995 | Rayner | |
| 6,941,323 B1 | 9/2005 | Galperin | |
| 2003/0018604 A1* | 1/2003 | Franz | G06F 17/3061 |
| 2003/0078914 A1* | 4/2003 | Witbrock | G06F 17/30864 |
| 2011/0097011 A1 | 4/2011 | Lim et al. | |
| 2011/0261049 A1 | 10/2011 | Cardno et al. | |
| 2012/0076427 A1* | 3/2012 | Hibino | G06K 9/00671 |
| | | | 382/218 |
| 2013/0162688 A1* | 6/2013 | Matsuoka | H04N 9/3188 |
| | | | 345/682 |

* cited by examiner

*Primary Examiner* — Amandeep Saini
(74) *Attorney, Agent, or Firm* — IP Spring

(57) ABSTRACT

Implementations relate to visualizing and measuring impact of image modifications. In some implementations, a method to measure and indicate impact of image modification includes applying an edit operation to a first image, including modifying one or more pixels of the first image to provide a modified image. The method determines an impact score associated with the edit operation and indicative of a degree of visual impact of the edit operation to the first image. The method provides, based on the impact score, the modified image in a visualization of image modification for the first image, and provides the visualization for display by a display device.

20 Claims, 8 Drawing Sheets

MEASURING AND VISUALIZING IMPACT OF IMAGE MODIFICATIONS

CROSS REFERENCE TO RELATED APPLICATIONS

The present application claims priority to U.S. Provisional Application No. 62/000,424, filed May 19, 2014, which is incorporated herein by reference in its entirety.

BACKGROUND

The popularity and convenience of digital cameras as well as the widespread of use of Internet communications have caused user-produced images such as photographs to become ubiquitous. For example, users of Internet platforms and services such as email, bulletin boards, forums, and social networking services post images for themselves and others to see. Some images are modified by automated processes and/or users. For example, automated processes can be used to automatically examine an image and enhance some image characteristics based on common or particular preferences and tastes. Also, a user can use an image editing program or similar tool to manually modify an image.

SUMMARY

Implementations generally relate to measuring and indicating impact of image modification. In some implementations, a method to measure and indicate impact of image modification includes applying an edit operation to a first image, including modifying one or more pixels of the first image to provide a modified image. The method determines an impact score associated with the edit operation and indicative of a degree of visual impact of the edit operation to the first image. The method provides, based on the impact score, the modified image in a visualization of image modification for the first image, and provides the visualization for display by a display device.

Various implementations and examples of the method are described. For example, the method can apply a second edit operation to the first modified image including modifying one or more pixels of the first modified image to provide a second modified image, determine a second impact score associated with the second edit operation and indicative of a degree of visual impact of the second edit operation to the first modified image, and provide, based on the second impact score, the second modified image in the visualization of image modification for the first image. The method can further include determining an overall degree of visual impact on the first image caused by the first and second edit operations based on combining the first and second impact scores, and providing an indication of the determined overall degree of visual impact to the first image in the visualization. The method can further include determining a ranking of the modified image with respect to other images, where the ranking is based on the impact score of the edit operation. Determining the ranking of the modified image can be based on a visual quality score of the modified image, and the visual quality score can be based on an exposure level of the modified image, a noise level of the modified image, and/or a sharpness level of the modified image.

Determining the impact score can include determining the impact score based on one or more characteristics of the edit operation and/or one or more characteristics of the application of the edit operation to the first image. For example, the characteristics of the edit operation can include a type of the edit operation, where each type of edit operation can be associated with a corresponding contribution to the impact score. The characteristics of the edit operation can include one or more parameter values applied with the edit operation, where a contribution to the impact score is based at least in part on the one or more parameter values. The characteristics can include the size of an area of the first image to which the edit operation is applied. The method can determine an estimated importance of the applied area of the first image as one of the characteristics, including examining the first image for one or more particular types of image features, one or more particular colors, and/or one or more particular locations in the first image. Determining the impact score can include weighting characteristics differently in the determination of the impact score.

The determining to include the modified image in the visualization can include comparing the impact score to an impact score threshold, and determining that the impact score satisfies the impact score threshold. Providing the visualization for display by a display device can include displaying the first image, the first modified image, and the second modified image in a sequence corresponding to a sequence of application of the first and second edit operations. The visualization can include at least one of a simultaneous display of the first image and the first and second modified images; and a sequential display in time of the first image, the first modified image, and the second modified image.

In some implementations, a system to measure and indicate impact of image modification can include a storage device and at least one processor operative to access the storage device and configured to obtain a first image, obtain a first modified image generated from a first edit operation applied to the first image, and obtain a second modified image generated from a second edit operation applied to the first modified image. The at least one processor is configured to provide a displayable visualization that includes the first image, the first modified image, and the second modified image.

Various implementations and examples of the system are described. For example, the at least one processor can be further configured to determine a first impact score associated with the first edit operation and a second impact score associated with the second edit operation, where the first impact score and the second impact score are indicative of a degree of visual impact of the first edit operation and the second edit operation, respectively, to the first image and the first modified image, respectively. The at least one processor can be further configured to determine to include the first modified image and the second modified image in the visualization based on the first impact score and the second impact score satisfying an impact score threshold. The first impact score can be based on one or more characteristics of the edit operation and/or the application of the first edit operation to the first image. The one or more characteristics include a type of the first edit operation, where each type of edit operation is associated with a corresponding contribution to the impact score, one or more parameter values used with the first edit operation and associated with corresponding amounts of contribution to the impact score, a size of an area of the first image to which the first edit operation is applied, and an estimated importance of the area of the first image determined by examining the image for one or more particular types of image features, particular colors, and/or particular locations in the first image.

In some implementations, a computer readable medium can have stored thereon instructions to measure and indicate impact of image modification that, when executed by a processor, cause the processor to applying one or more edit operations to modify an image and determine one or more individual impact scores for the edit operations. The processor is caused to determine, based on the one or more individual impact scores, a visualization that indicates the modification of the first image by the one or more edit operations, and provide the visualization for display by a display device.

In various implementations of the computer readable medium, the instructions cause the processor to provide a modified image for each of the one or more edit operations, where each modified image associated with an edit operation having an individual impact score satisfying an impact score threshold is included in the visualization. The instructions further cause the processor to combine the one or more individual impact scores to determine an overall degree of visual impact of the one or more edit operations with respect to the image, and provide an indication of the determined overall degree of visual impact in the visualization. In some implementations, the instructions cause the processor to apply the edit operations sequentially such that a first edit operation is applied to the first image and each subsequent edit operation modifies a modified image resulting from a previous edit operation. The instructions can cause the processor to determine an accumulated impact score that includes the individual impact score associated with a particular edit operation and the individual impact score associated with at least one of the edit operations which does not satisfy an impact score threshold and is applied prior to the application of the particular edit operation, and to add the modified image associated with the particular edit operation to the visualization based on the accumulated impact score satisfying the impact score threshold.

DETAILED DESCRIPTION

Figure 1:
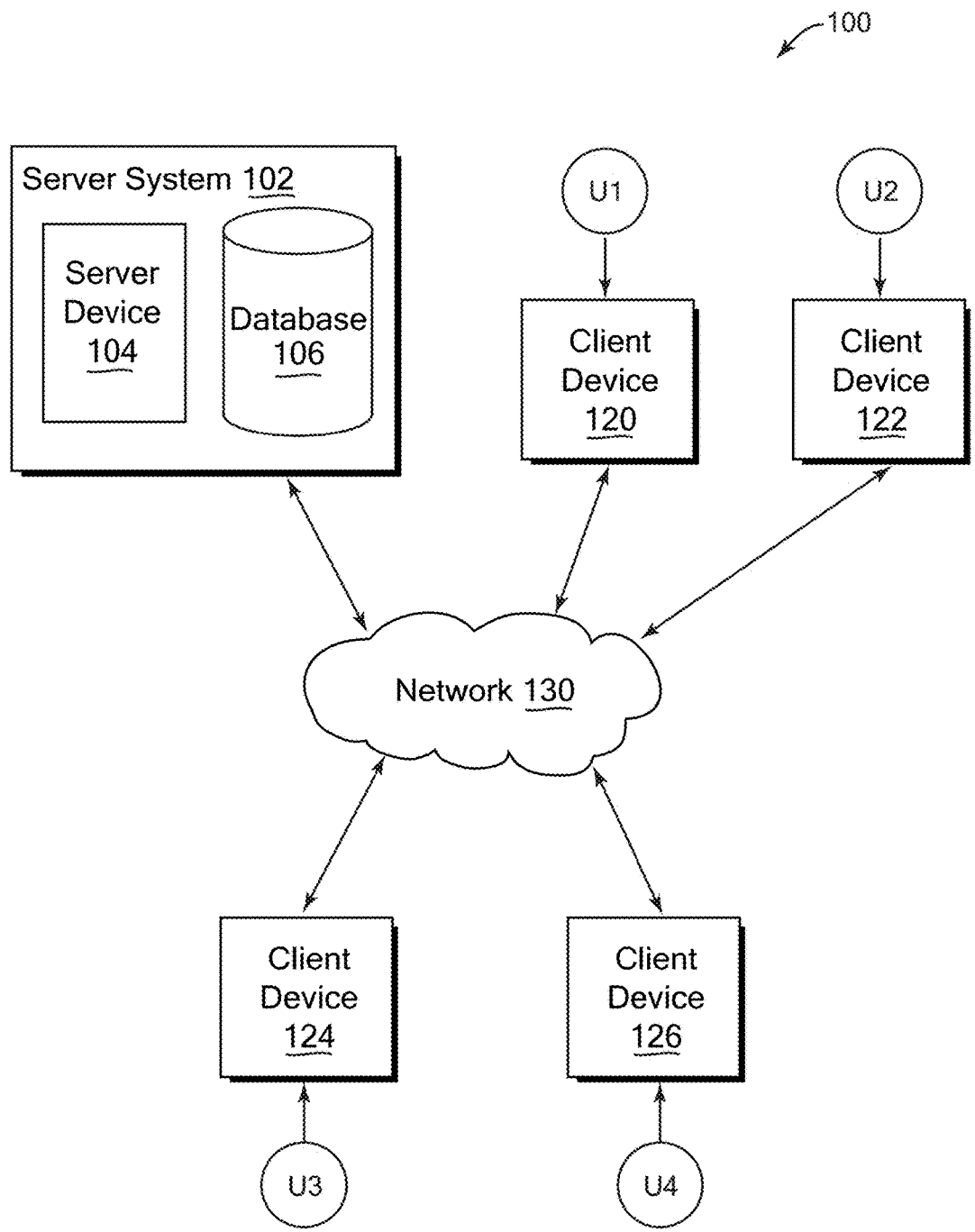
FIG. 1 is a block diagram of an example network environment which may be used for one or more implementations described herein.

One or more implementations described herein relate to measuring and/or indicating image modifications. In some implementations, a system (or method implemented thereon) can examine the visual impact of one or more edit operations applied to an image. For example, impact scores can be assigned to individual edit operations to indicate their visual impact. An overall score, and/or rank relative to other images, can be assigned to the image based on individual visual impact scores of edit operations. In some implementations, a visualization of modifications made to the image by the edit operations can be provided, where the visualization can include one or more modified images showing various stages of modification to the original image. For example, a system can use the visual impact scores to include in the visualization only those modified images that show the most visible or most significant visible impact from the edit operations. Some implementations can use a selected or predetermined range of visual impact to determine which modified images to include in the visualization.

In some example implementations, impact scores for individual edit operations can be determined based on a variety of edit characteristics. For example, impact scores can be based on characteristics of the associated edit operation and/or the application of the edit operation to the particular image. For example, the characteristics can include a type of the edit operation, values of one or more parameters used with the edit operation, a size of the area of the image to which the edit operation is applied, and/or an estimated importance of the area to which the edit operation is applied (e.g., based on examining the image for types of image features, e.g., faces, monuments, objects, landscape, background, etc., particular colors, particular locations in the image relative to the image area and borders of the image, etc.). The impact scores for different individual edit operations applied to the image can be combined to determine an overall impact score to indicate the degree of visual impact on the image.

Some example implementations can provide a visualization for display and indicating the modifications made to an image. For example, the edit operations can be sequentially applied such that each subsequent edit operation modifies the image resulting from a previous edit operation, and the visualization can include multiple modified images, e.g., showing the stages of modification of from the original image. For example, modified images included in the visualization can be associated with edit operations having impact scores satisfying a predetermined impact score threshold. In some examples, the images in the visualization can be displayed on a display device sequentially or simultaneously.

These and other described features can allow images to be ranked and presented based on the visual impact of image processing and editing that has been performed on the images. For example, such features can inform users of visual changes made to images by automatic image processing systems as well as changes made to images by users themselves. For example, a system can display impact scores of images, display a list of images that have been ranked according to the visual impact of the changes made to those images, and/or display visualizations of the changes to the images, allowing a user to view this displayed information and easily track changes made to various images (e.g., photos). Image services can also make use of such features, e.g., network services including photo collection sites, social networking sites, etc. The network services may provide automatic enhancement of images to improve image quality, and such services can use described features to showcase such enhancement. For example, network services can present ranked lists of user images that are the most dramatically improved by the service's automatic enhancement, and can present graphical visualizations of the enhancements.

A system using features described herein can increase efficiency and flexibility of systems related to image tracking and editing. For example, described features allow image modifications to be easily characterized and visualized, allowing users to view and understand the significance of their own edits to images. Services that use described features can more easily show users the effectiveness of automatic image enhancement, thus creating more user goodwill. The system therefore can reduce time and effort in reducing tedious manual examination and tracking of changes to images. Furthermore, described features can automatically present images having modifications with visual impact, allowing users to more easily determine which edits to images are most visually effective and to more easily learn better image editing techniques. Some features can provide flexibility in determining a visualization of edit operations for a user that is customized to the user's preferences.

Herein, an "edit operation" can be an image processing operation or technique, e.g., modifying color, size, orientation, compression (which may not alter color), visible area (e.g., via cropping or other operation), or other image characteristics. For example, an edit operation can be a filter which changes one or more pixel values based on one or more parameters of the filter. In some examples, an edit operation can be a "preset" which can be a collection of one or more filters or other edit operations having parameters predefined to assume predetermined values and achieve a desired effect on the image. "Visual impact" in an image refers to the amount of human-perceptible difference in an image between an earlier state of the image (e.g., as an input image) and a later state of the image (e.g., as an output image), where the output image is an instance of the initial image that has been modified using one or more edit operations. In addition, an "image" as referred to herein can be a still image or standalone image, or can be an image in a series of images, e.g., a frame in a video sequence of frames. For example, implementations described herein can be used with a single image or with a series or video sequence of images.

FIG. 1 illustrates a block diagram of an example network environment 100, which may be used in some implementations described herein. In some implementations, network environment 100 includes one or more server systems, e.g., server system 102 in the example of FIG. 1. Server system 102 can communicate with a network 130, for example. Server system 102 can include a server device 104 and a database 106 or other storage device. Network environment 100 also can include one or more client devices, e.g., client devices 120, 122, 124, and 126, which may communicate with each other and/or server system 102 via network 130. Network 130 can be any type of communication network, including one or more of the Internet, local area networks (LAN), wireless networks, switch or hub connections, etc.

For ease of illustration, FIG. 1 shows one block for server system 102, server device 104, and database 106, and shows four blocks for client devices 120, 122, 124, and 126. Server blocks 102, 104, and 106 may represent multiple systems, server devices, and network databases, and the blocks can be provided in different configurations than shown. For example, server system 102 can represent multiple server systems that can communicate with other server systems via the network 130. In another example, database 106 and/or other storage devices can be provided in server system block(s) that are separate from server device 104 and can communicate with server device 104 and other server systems via network 130. Also, there may be any number of client devices. Each client device can be any type of electronic device, e.g., computer system, portable device, cell phone, smart phone, tablet computer, television, TV set top box or entertainment device, personal digital assistant (PDA), media player, wearable device (e.g., goggles or glasses, watch, armband, headset, jewelry, etc.), game device, etc. Some client devices may also have a local database similar to database 106 or other storage. In some implementations, network environment 100 may not have all of the components shown and/or may have other elements including other types of elements instead of, or in addition to, those described herein.

In various implementations, end-users U1, U2, U3, and U4 may communicate with the server system 102 and/or each other using respective client devices 120, 122, 124, and 126. In some examples, users U1, U2, U3, and U4 may interact with each other via applications running on respective client devices and/or server system 102, and/or via a network service, e.g., a social network service or other type of network service implemented on server system 102. For example, respective client devices 120, 122, 124, and 126 may transmit communications and data to one or more server systems (e.g., system 102). In some implementations, server system 102 may provide appropriate data to the client devices such that each client device can receive communicated content or shared content uploaded to the server system 102 and/or network service. In some examples, the users can interact via audio or video conferencing, audio, video, or text chat, or other communication modes or applications. A network service implemented by server system 102 can include a system allowing users to perform a variety of communications, form links and associations, upload and post shared content such as images, text, video, audio, and other types of content, and/or perform socially-related functions. For example, a social network service can allow a user to post or send content including information describing edit operations made to an image and/or visualizations of image modifications as described herein, to particular or multiple other users or client devices. Users may be able to use the network service to form social links in the form of associations to other users within the network service, group other users in user groups, participate in live video, audio, and/or text chat with other users of the service, etc. In some implementations, a "user" can include one or more programs or virtual entities, as well as persons that interface with the system or network.

A user interface can enable display of images and other content as well as communications, privacy settings, notifications, and other data on a client device 120, 122, 124, and 126. Such an interface can be displayed using software on the client device and/or a combination of client software and server software executing on the server system 102, e.g., application software or client software in communication with the server system. The user interface can be displayed on an output device of a client device, e.g., a display screen.

In some implementations, server system 102 and/or one or more client devices 120-126 can store and/or run an image editing application. The image editing application may allow a system (e.g., client device or server system) to display an image and provide options allowing a user to edit various characteristics of images. The image editing application can provide an associated image editing user interface that is displayed by a display device of the server system or client device. The image editing user interface may provide various editing tools and display the image. The image editing user interface may provide, for example, one or more crop windows and related tools as described herein. In some implementations, the image editing application, or a different visualization application, can be implemented on a system to display visualizations of image modifications as described herein.

Other implementations can use any type of system and service. For example, any type of electronic device can make use of features described herein. Some implementations can provide features described herein on client or server systems disconnected from or intermittently connected to computer networks. In some examples, a client device having a display screen can display images and provide features and results as described herein that are viewable to a user.

Figure 2:
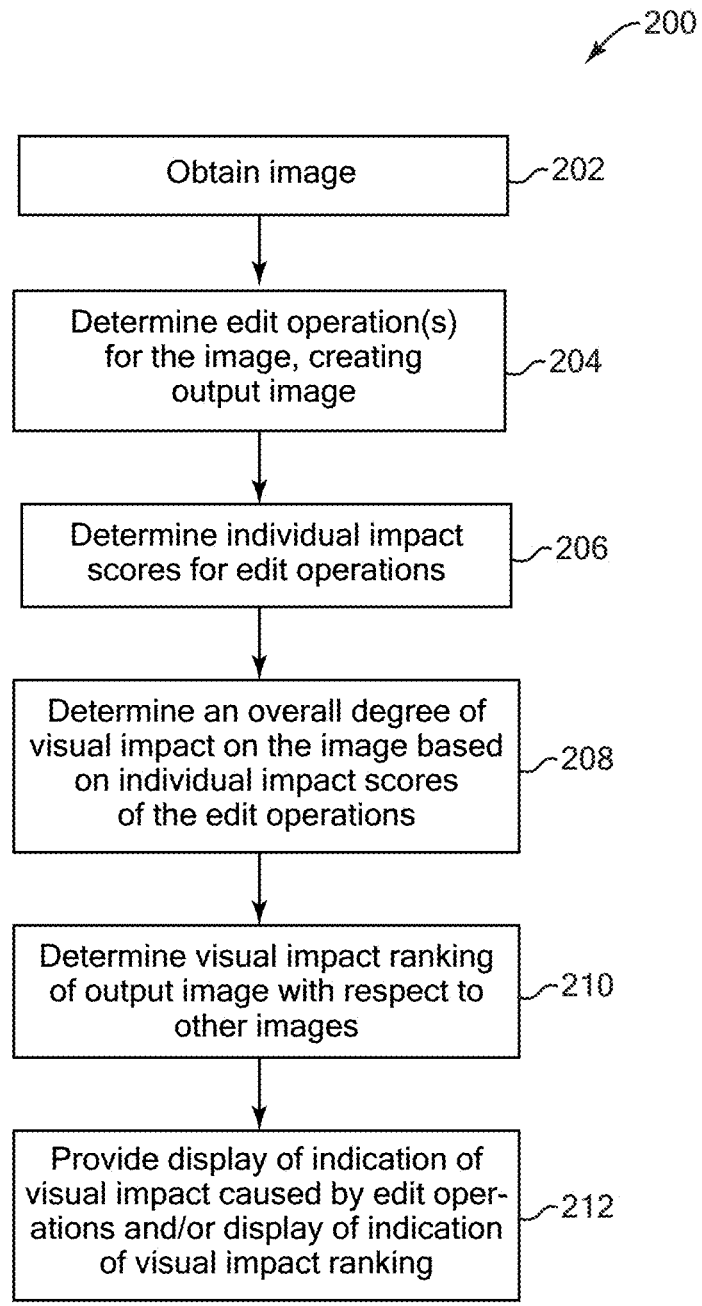
FIG. 2 is a flow diagram illustrating an example method for measuring visual impact of modifications to an image, according to some implementations.

FIG. 2 is a flow diagram illustrating an example method 200 to measure visual impact of modifications to an image. In some implementations, method 200 can be implemented, for example, on a server system, e.g., server system 102 shown in FIG. 1. In some implementations, some or all of the method 200 can be implemented on a system including one or more client devices, e.g., client devices 120, 122, 124, or 126 shown in FIG. 1, and/or on both a server system and a client system. In described examples, the implementing system includes one or more processors or processing circuitry, and one or more storage devices (e.g., a database 106 or other storage). In some implementations, different components of one or more servers and/or clients can perform different blocks or other parts of the method 200.

In some implementations, the method 200 can be initiated automatically by a system. For example, the method (or portions thereof) can be periodically performed, or performed based on one or more particular events, e.g., one or more original images being newly uploaded to or accessible by the system, or one or more conditions specified in custom preferences of one or more users of the system or in system default settings. In some examples, a camera, cell phone, tablet computer, wearable device, or other client device can capture an image and can perform the method 200. In addition or alternatively, a client device can send a captured image to a server device over a network, or the server device can obtain an image from other sources (e.g., other servers, storage, etc.), and the server device can process the image using method 200. Some implementations can initiate method 200 based on user input. A user may, for example, have selected the initiation of the method 200 from a user interface, e.g., a social networking interface, application interface, or other interface.

In block 202 of method 200, the method obtains an image for processing. For example, the method can select an image from one or more images stored in memory or other storage device, can receive or retrieve the image from a source (storage device, a different device over a network, etc.), etc. The image can be a digital image composed of multiple pixels, for example, and can be stored on one or more storage devices of the implementing system or otherwise accessible to the method, e.g., a local storage device or storage device connected to or in communication with a network accessible to the system. In various implementations, the image can be automatically selected by the method. For example, the image can be obtained from a variety of sources, e.g., uploaded by a user to a server over one or more networks, an image from an album or other stored collection of multiple images, etc. The collection can be locally stored and accessible by the device performing method 200, and/or can be remotely stored on a server or client device, e.g., as an album provided in an account of a user of a social networking system. In some implementations, the system can determine which image to select based on evaluating one or more characteristics of accessible images, e.g., the color distributions of images, timestamps and other metadata of images, and/or identified and recognized content depicted in the images (e.g., persons, faces, or objects). Alternatively, a user can provide or designate one or more images to obtain.

In block 204, the method determines one or more edit operations (e.g., image processing operations) for the image. For example, in some implementations the method applies the one or more edit operations to the image to modify the image, e.g., modifies one or more pixel values of one or more pixels of the image to apply the edit operation to the image. In some implementations, the image is initially considered an input image and each edit operation provides a modified image derived from the input image. In some examples, the edit operations can be performed in a sequence such that a first edit operation is applied to the input image and each successive edit operation is applied to the modified image that resulted from the previous edit operation of the sequence. After the edit operations have been applied, a "final" modified image (e.g., final with respect to the currently-provided edit operations to be performed) has been created and includes the edit operations applied to the image starting with the input image. The final modified image can be considered an output image.

In some implementations, the method can determine that one or more of the edit operations have been or will be applied to the image. For example, the method can receive information describing the application of the edit operations by a different process, e.g., information indicating which edit operations have been or will be applied to the image (e.g., applied to the input image or to a derived modified image) by one or more other processes, the sequence of application of those edit operations, and/or the particular parameters used for those edit operations. For example, if the edit operations have been applied, the method can determine the impact scores and other information in the blocks of method 200 based on the received information describing the applied edit operations and by comparing modified images before and after application of each edit operation.

The edit operations can include any modifications to the visual characteristics of one or more pixels of an image. For example, the edit operations can be applied through application of a filter, preset, or other change in pixel color values in some implementations. In some implementations, the edit operations can modify other image characteristics such as size, orientation (e.g., rotation of image, etc.), visible area, etc. In some cases, an edit operation can be a change of a single visual characteristic of the image, e.g., brightness. In other cases, an edit operation can include multiple changes, e.g., changes to different characteristics of the image (e.g., brightness and contrast, color warmth and saturation, or several characteristics changed in a filter, e.g., an aging or "retro" filter that changes an image to have a worn, scratched, and/or otherwise aged appearance like an old photograph, etc.). Some additional examples of edit operations are described below.

In block 206, the method determines individual impact scores for the edit operations. For example, the method can determine an individual impact score for each edit operation applied to an image (e.g., applied to the initial input image or to a successive modified image). An individual impact score is an estimated measurement of a visual impact that the associated individual edit operation has made to an image, e.g., as compared to the visual appearance of the image before that edit operation was applied. The individual impact score can be based on any of a variety of different factors related to the image and/or to the individual edit operation that was applied, including one or more particular characteristics of the associated edit operation. In some implementations, the factors can include one or more characteristics of the application of the edit operation to the image and/or of the modification to the image caused by the edit operation. Example characteristics can include the type of the edit operation, magnitude of parameters used by the edit operation, location of application of and/or modification by the edit operation in the image, extent or size of application and/or modification by the edit operation in the image, etc. Some examples of factors are described in greater detail below with respect to FIG. 4.

In block 208, the method determines an overall degree of visual impact on the image based on impact score(s) determined for individual edit operation(s). For example, the method can determine a total or overall impact score for the image, which can indicate the visual impact of all the edit operations performed on (or to be performed on) the input image, e.g., indicate a viewer-perceptible difference between the input image and the output image. The total impact score can be based on individual impact scores of edit operations determined in block 206. For example, the individual impact scores of the edit operations of block 206 can be combined to obtain the total impact score, e.g., by summing the individual impact scores and/or by performing a different function to combine the individual impact scores, e.g., an averaging function and/or other types of functions. Some implementations can weight one or more individual impact scores differently in the determination of the total impact score, e.g., such that different individual scores may contribute a greater or lesser amount to the total impact score based on their weighting factor. For example, one or more edit operation characteristics and/or application characteristics related to an individual impact score can influence such weighting, some examples of which are described below with reference to FIG. 4.

In block 210, the method (optionally) determines a visual impact ranking of the output image based on the total impact score determined in block 208. The ranking can indicate the amount of impact that edit operation(s) have made upon the output image with respect to multiple other images. In some examples, the image can be ranked in correlation with the degree of visual impact provided by the one or more edit operations, e.g., the image can be ranked higher in response to the applied edit operations creating a larger degree of visual impact in the modified output image. For example, the total impact score of the output image can be compared to total impact scores that are stored in association with the other images so that the rank of the output image can be determined in comparison to the other images. In some implementations, overall image quality can also be included in the ranking determination. The other images can be any set of images. For example, the other images can be images owned or accessible to a user who also owns or can access the output image, or images of multiple users stored by an image collection or distribution service, social networking service, or other network service accessible over a network by the system processing the output image.

Some implementations can determine a visual impact ranking of the output image based on individual impact scores instead of or in addition to the total impact score of block 210. For example, an individual impact score for a particular edit operation applied to the image may indicate a particularly high visual impact for that edit operation (e.g., a high individual impact score that satisfies a predetermined threshold), and the edit operation may be known to be of a type that provides high visual impact as compared to other types of edit operations (e.g., a list can be maintained of known high-impact edit operations). These conditions can influence the ranking of the output image to be higher than if the individual impact score did not indicate significant visual impact (e.g., the individual score did not satisfy the threshold) and/or if the edit operation was not of a type known to provide high visual impact. In some implementations, individual edit operations can be ranked with respect to other edit operations applied to the image, and/or ranked with respect to individual edit operations applied to other images. For example, individual edit operations can be ranked based on their individual impact scores.

In block 212, the method provides a display of an indication of visual impact on the image caused by the edit operations of block 204, and/or provides a display of an indication of the ranking of the output image. The display can be provided by a display device, e.g., connected to a system implementing method 400 and/or a different system.

In some implementations, the method can cause or provide a display of an indication of the visual impact on the image caused by the edit operations, e.g., by a display device. For example, the method can display a visualization indicating the modification to the input image. In some implementations, the visualization can include one or more modified images. Some examples of such visualizations are described below with respect to FIGS. 3 and 4. In some implementations, a visualization can display the total impact score determined in block 208, and/or display one or more of the individual impact scores of block 206. Some visualization implementations can display descriptions of the edit operations associated with individual impact scores. In some implementations, the visualization can include an indication (e.g., a summary) of the visual impact based on the total impact score compared to predefined ranges of scores. For example, the method can output a description of "minor visual change" if the total impact score is less than a predetermined lower total score threshold, output a description of "some visual change" if the total impact score is between the lower total score threshold and a higher total score threshold, and output a description of "major visual change" if the total impact score is greater than the higher total score threshold. In some implementations, the displayed indication of visual impact can be accompanied by a display of the output image, the input image, and/or one or more intermediate modified images resulting from a sequence of application of the edit operations.

In some implementations, the method can cause display of an indication of the visual impact ranking of the output image determined in block 210. In some implementations, the indication of ranking can be displayed in a visualization of image modifications. Some implementations can display the output image in a manner to indicate its ranking In some examples, the output image can be displayed within a ranked order including the output image and the other ranked images, e.g., displayed in a list or sequence of images that are displayed in the ranking order. For example, a ranked sequence of images can be displayed on a displayed area of a display device in a spatial sequence (e.g., a sequence indicated by a top to bottom order, left to right order, etc.) and/or a time sequence (e.g., a sequence indicated by displaying images in the sequence over time). In some implementations, the ranking can be used to display the most visually changed images in a collection of images, e.g., used by an image collection service to showcase the most visually changed images stored in a user's collection, stored on the site, and/or stored in a particular category or topic matching the content of the images (e.g., where an image's topics or categories can be based on labels stored as image metadata and describing the image content, or based on recognized image features in the image (e.g., using image recognition techniques), etc.).

Some examples of details and features that can be used in method 200 are described below with reference to FIG. 4.

Figure 3:
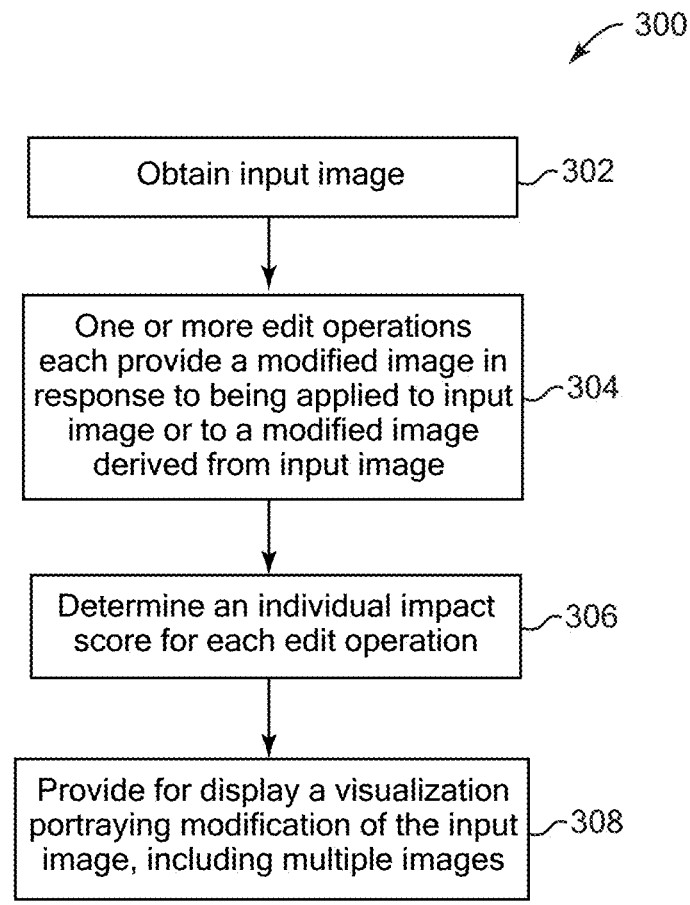
FIG. 3 is a flow diagram illustrating an example method for providing a visualization of image modifications, according to some implementations.

FIG. 3 is a flow diagram illustrating an example method 300 to provide a visualization of image modifications. Method 300 can be implemented by a system that is or includes, for example, a server and/or client device as described above for method 200. In some implementations, method 300 can be performed by a system that also measures the visual impact of images as described above in method 200 of FIG. 2. One example of combining measuring and visualization features for images based on visual impact of image modifications is described below with respect to FIG. 4. Some systems can perform method 300 without performing method 200 or independently and/or separately from method 200.

In block 302, the method obtains an input image, e.g., similarly as described above for block 202 of FIG. 2. In block 304, the method determines that one or more edit operations (e.g., image processing operations or techniques as described above) have each provided a modified image derived from the input image, where the edit operations are applied to the input image or modified images. In some examples, the edit operations can be performed in a sequence such that that the first edit operation is applied to the input image and each successive edit operation is applied to the modified image resulting from the previous edit operation of the sequence. For example, the final modified image in the sequence can be considered an output image. In some implementations, the method can apply one or more of the edit operations to obtain one or more of the modified images. Some implementations can obtain modified images by receiving one or more of the modified images that are provided by a different process(es) that performed the associated edit operations. In some implementations, the method can also receive information describing the application of the edit operations by a different process, e.g., information indicating which edit operations have been applied to the input image or to a derived modified image, the sequence of application of the edit operations, and/or the particular parameters used for the edit operations. Similarly as described above for block 204, an edit operation can include any modification(s) to the visual characteristics of one or more pixels of an image, e.g., application of one or more filters, presets, or other changes in pixel color values in some implementations. In various cases, an edit operation can be a change of a single visual characteristic of the image, or can include multiple changes.

In block 306, some implementations of the method can determine an individual impact score for each of the edit operations of block 304. For example, the method can calculate one or more of the individual impact scores similarly as described herein, and/or can obtain one or more of the individual impact scores from one or more other processes that have calculated the individual impact scores. Each individual impact score can be an estimated measurement of a visual impact that the associated edit operation has made to an image as compared to the visual appearance of that image before that edit operation was applied. This block can be performed similarly to block 206 of FIG. 2, for example.

In block 308, the method provides for display a visualization of modification for the input image, where the visualization includes multiple images. An image modification "visualization," as referred to herein, is a visual presentation of images indicating the modification to an input image caused by one or more edit operations. In some implementations, the visualization can include the input image and multiple modified images showing modifications to the input image and to other modified images. The modified images can show a progression of changes over sequential modifications to the input images, in some implementations. For example, the visualization can be provided to and displayed by a display device included in or in communication with the system implementing method 300, e.g., a display screen, projector, etc.

In some implementations, block 308 can include creating the visualization from the input image and modified images described above for blocks 302 and 304. In some implementations, the input image and all determined or obtained modified images can be included in the visualization. In some of these implementations, the individual impact scores of block 306 may not be needed and block 306 can be omitted.

In some implementations, the method can examine the modified images of block 304 and determine which of the modified images should be included in the visualization. For example, this determination can be based on the individual impact score associated with each edit operation that provided a modified image. For example, modified images that are associated with impact scores satisfying an impact score threshold can be included in the visualization. In some implementations, the modified images that satisfy the threshold have achieved a threshold level of visual impact. In some examples, if a modified image has a threshold level (or better) of visual impact relative to the previous image provided in the sequence of edit operations (e.g., change in visual impact relative to the previous image), then it is retained and included in the visualization. If a modified image does not satisfy (e.g., has less than) the threshold level of visual impact relative to the previous image, then it can be removed, discarded, or not included in the visualization. Some examples of such evaluation and visualization is described below with reference to FIG. 4. In some implementations, criteria for including one or more modified images in the visualization can be predetermined and/or specified, e.g., by default criteria and/or by a user via user input provided to the method via a user interface (e.g., stored user preferences or user selections). Some implementations can use a predetermined or selected range (e.g., threshold range) of visual impact to determine which modified images to include in the visualization. For example, in some implementations, modified images having a visual impact (relative to the previous image) over a particular threshold amount may be undesired and are not included in the visualization. In various implementations, modified images having visual impact within a particular range (e.g., having upper and lower thresholds) can be included (or excluded) from the visualization.

In some implementations, the visualization can include all modified images regardless of their individual impact scores. In some implementations, the visualization can include modified images that resulted from the application of particular types of edit operations (e.g., filters) that are predetermined and designated as important or significant edit operations. For example, visual impact of edit operations as described above need not be measured for such important edit operations.

The visualization can be output by a display device in any of a variety of forms. The visualization images can be displayed, in whole or in part, simultaneously, sequentially, or in a combination of simultaneous and sequential presentations. Some visualization examples are described below with reference to FIG. 4.

Figure 4:
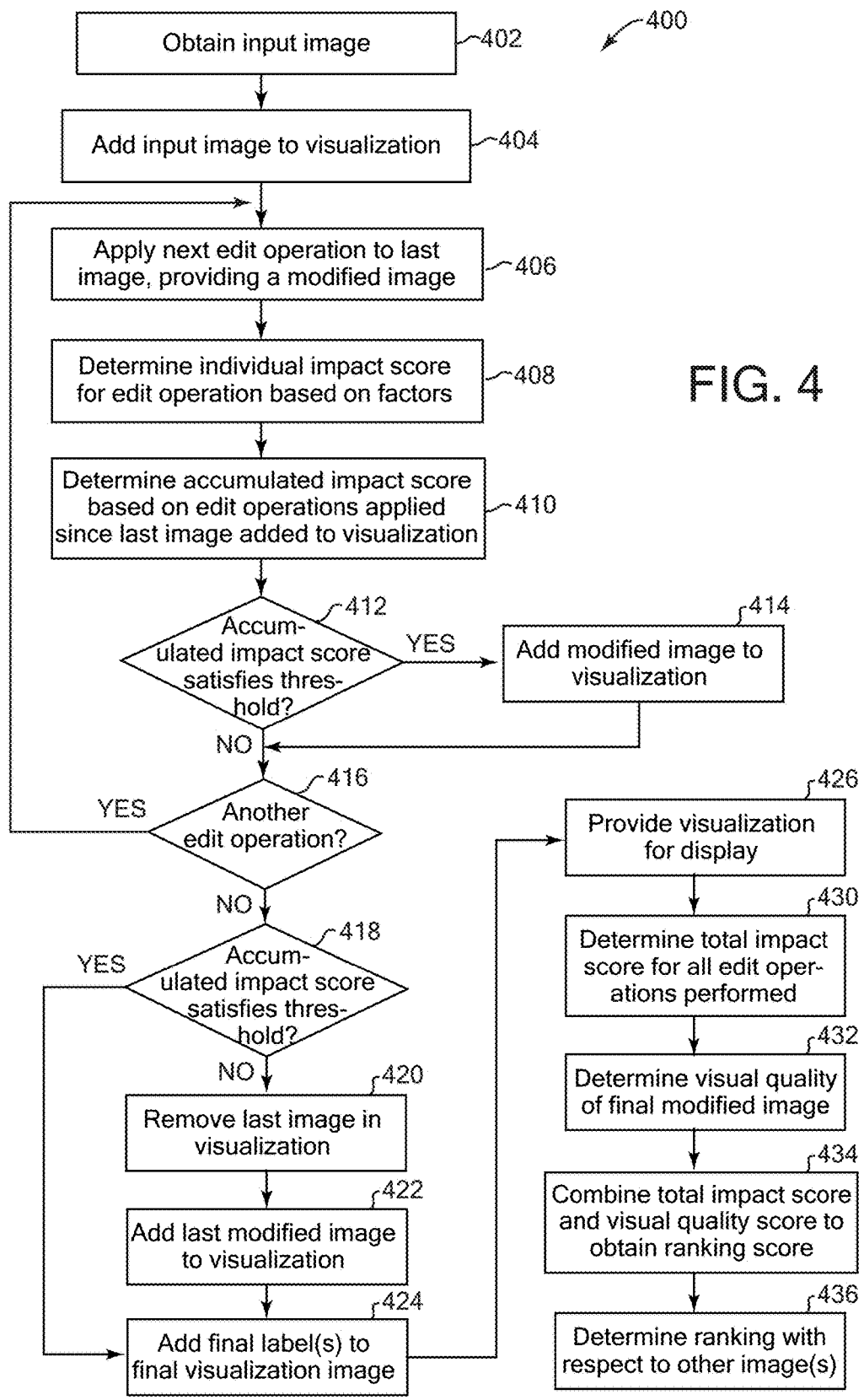
FIG. 4 is a flow diagram illustrating an example method including visualizing and measuring visual impact of image modifications, according to some implementations.

FIG. 4 is a flow diagram illustrating an example method 400 including measuring and visualizing visual impact of image modifications. Method 400 can be implemented by a system, e.g., a server and/or client device as described above for methods 200 and 300.

In block 402, the method selects and/or obtains an input image, e.g., similarly as described above for blocks 202 and 302. In block 404, the method adds the input image to a visualization. In this example, the visualization can be a stored set of visualization images including an input image (e.g., initial or starting image) and multiple modified images that show a sequence of modifications to the input image. For example, if an image is added to the visualization, the image can be displayed in response to the visualization being displayed (or the image can be displayed based on user input, etc. if the visualization is to be displayed). In the described implementation of block 404, the input image can be added to the visualization as the first or starting visualization image in a visualization sequence that indicates the sequence of modifications to the input image. Some implementations can add the input image to other positions in the visualization sequence, e.g., after an existing set of images already stored in the visualization from a different or earlier process. Some implementations can add the input image to a visualization that does not display a sequence of images, e.g., displays a simultaneous spatial arrangement of the input image and modified images.

In block 406, the method applies the next edit operation to the last image, thus providing a modified image. In the first iteration of block 406, the last image is the input image obtained in block 402. In one or more later iterations, the last image can be a modified image that was most recently created by applying a previous edit operation. The edit operation can provide a modification of one or more image characteristics, as described above for FIGS. 2 and 3, and/or can include the application of one or more filters, presets, or other changes to the last image. In some implementations, the edit operation can use one or more parameters that define the modification(s) made by the edit operation. For example, the parameters can be magnitudes of changes made to particular characteristics of one or more pixels of the image (e.g., +30 to brightness magnitude, −15 to contrast magnitude, etc., in a predetermined scale).

In some implementations, the edit operation applied in block 406 is an automatic enhancement of the input image. For example, a user of a network service (e.g., a social networking service, photo collection or photo serving service, etc.) can upload an input image to a system implementing method 400 as part of the service over a network (e.g., the Internet). The system can examine the input image and apply one or more edit operations to enhance the input image. For example, the system can measure brightness, contrast, saturation, and other image characteristics of one or more pixels of the input image and can decide to apply one or more edit operations to enhance the image, based on predetermined criteria to achieve predetermined desired results. In another example, the system can examine the content of the image, e.g. using object recognition techniques, facial recognition techniques, and other techniques, to determine if one or more edit operations should be applied as part of the automatic enhancement. For example, the system can determine that one or more faces are located in the input image that would benefit from a vignette edit operation that applies a gradually-darkening effect to border areas of the image surrounding a center region of predetermined size or determined size. The system can determine the various parameters of the edit operation that need to be changed. If the system decides that multiple edit operations are to be applied (e.g., in a particular order), then an appropriate one of those edit operations is selected and applied in block 406.

In some implementations, the edit operation applied in block 406 is specified by a user, e.g., it is a manual edit operation. For example, a user can cause various types of edit operations to be performed on an image using functions of an image editing program running on the user's device or running on a server in communication with the user's device. The user can change particular parameters to perform the edit operation, e.g., change parameters of a filter. If the user has instructed to apply multiple edit operations, one of those edit operations can be selected and applied in block 406. In some implementations, a combination of multiple image processing operations can be selected as an "edit operation" and applied in combination or sequence in block 406.

In other implementations, the method 400 does not apply the edit operation, and block 406 can include receiving the modified image from a particular source after a different process has applied the edit operation to create the modified image (e.g., and store it in an accessible storage device or send it to the method 400). In some implementations, other data describing the edit operation can also be obtained by method 400, e.g., the particular parameters used, the time when the edit operation was performed, a sequence of edit operations, etc.

In block 408, the method determines an individual impact score for the edit operation applied in block 406 based on one or more particular factors. As described above with reference to FIG. 2, the individual impact score can measure a visual impact that the associated edit operation has made to an image as compared to the visual appearance of the image before that edit operation was applied. In some implementations, each factor of a set of predetermined factors can be evaluated for the applied edit operation and each factor evaluated for the image to which it was applied (if appropriate), and a contribution amount or value can be determined for each factor based on how the edit operation provides or implements that factor and/or applies that factor to the image. For example, the contribution value can be added to the individual impact score for the edit operation.

Some examples of factors that can be used to assist determination of the impact score are described below as characteristics of the edit operation, and/or characteristics of the application of the edit operation to the image. In these examples, a higher impact score indicates a greater visual impact than a lower impact score. However, other implementations can reverse this convention (e.g., use a lower score for more visual impact), or can use a different score system to indicate greater vs. lesser impact. Other factors (e.g., other edit operation characteristics) can also or alternatively be used to determine an individual impact score for an edit operation.

One example characteristic of the edit operation that can influence the impact score is the particular edit operation being applied, e.g., the type of edit operation. For example, each type of edit operation can be associated with a corresponding amount of contribution to the impact score. In some examples, certain types of edit operations can be known to have a greater visual impact on an image's visual appearance than other types, and so the types having greater impact can provide a larger contribution value to the impact score than other types. For example, an edit operation that typically affects a main subject of an image and/or affects a depicted object that typically attracts the eyes of viewers in an image, can be assigned a larger impact score. In one example, a skin softening type of edit operation blurs details of faces detected in an image (e.g., by detecting faces in an image using facial recognition techniques and applying a skin softening blur (and/or other modifications) to facial pixels of the image). Since faces are known to draw the attention of image viewers, a skin softening type of edit operation can provide a larger contribution value to its impact score than, for example, other edit operations that affect all image features equally. Other edit operations that generally affect faces more than other types of image features can similarly contribute a larger contribution value. In contrast, a type of edit operation that is known to typically modify all content of an image equally (e.g., a brightness filter) can contribute a lower or average contribution value based on its type. In another example, one type of edit operation (e.g., a contrast filter) may be known (e.g., through previous observational testing by many persons) to visually change an image in subtler ways (regardless of its parameter values) than a different type of edit operation (e.g., a saturation filter). Thus, in such a case, the former type of edit operation (e.g., contrast filter) would contribute a lower contribution value to the impact score than the latter operation (e.g., saturation filter) based on their types.

Another characteristic of the edit operation that can influence the impact score are the parameter(s) used to govern the application of an edit operation. In some implementations, the values of the parameters can be associated with corresponding amounts of contribution to the impact score. For example, a parameter value that is greater may indicate that the associated edit operation was applied in a greater amount or magnitude to the image, and so the greater parameter value provides a greater contribution value to the impact score than the same edit operation applied with a lower value in that same parameter. For example, a brightness edit operation applied with a parameter value of +60 increases the brightness of the image pixels to a greater extent than a brightness operation applied with a parameter value of +10, and so the operation with the greater parameter value provides a greater contribution value to the impact score.

Some characteristics that can be used to influence the impact score may relate to the application of the edit operation to the particular image (e.g., which can be referred to herein as "application characteristics"). In some implementations, the application of the edit operation can be considered without regard to the actual modification made to the image by the edit operation, e.g., by examining an area or pixel values of the image which will be affected by the edit operation. In some implementations, the application of the edit operation can include consideration of the resulting modification to the particular image made by the edit operation.

In some examples, application characteristics may vary in their visual influence (e.g., contribution value) based on how the edit operation is applied to and/or affects this particular image. For example, the visual influence of the edit operation on the image may be based on particular image features depicted in the image and modified by the edit operation, e.g., the types of image features (faces, objects, landscapes, monuments, etc. as detected by image content recognition techniques), the size of those image features, the spatial position of those image features in the image, the spatial relationship between image features, etc. The visual influence of the edit operation may be based on the color of pixels of the image that are affected by the edit operation, e.g., particular color(s) present in the image, the number of pixels having those colors, the shape or size of collections of contiguous pixels having those colors, etc. The visual influence of the edit operation may be based on other characteristics of modified pixels in the image other than color, e.g., brightness, contrast, gradients of color or brightness between adjacent pixels, etc. Application characteristics based on the actual modification to the image can be determined after the edit operation is applied to and modifies the image.

In some examples, an application characteristic that can influence the impact score based on edit operation application to the image is the size of the area of the image to which the edit operation is applied (e.g., the size of the area to be modified and/or modified by the edit operation). For example, the method can determine how many pixels and/or the percentage of all image pixels that are modified in the image due to application of the edit operation (e.g., image pixels that will be modified, or have been modified). In some examples, the method can determine modification in one or more pixel values of the pixels (color, brightness, etc.), e.g., by checking pixels for more than a threshold amount of change in the pixel values. An edit operation that is determined to be applied to a smaller area of an image will have a smaller contribution to the impact score than an edit operation determined to be applied to a larger area of the image, based on the modified image area size. Thus, a larger size of application can provides a larger contribution to the impact score. For example, an edit operation that is applied to 1% of the area of an image can contribute a smaller value to the impact score than an edit operation applied to the entire image or to 30% of the area of the image, based on the size characteristic. The size of the area affected image area may not be known until the edit operation is applied to an image. For example, a color edit operation that changes yellow hues will modify a variable-sized image area, depending on the colors in a particular image.

Another modification characteristic that can influence the impact score is an estimated importance of the image area(s) of the image to which the edit operation is applied and/or which the edit operation modifies (e.g., modifies more than a threshold amount in pixel value). For example, the method can determine which pixels of the image are modified by the edit operation similarly as described above and whether those pixels are included in any detected important image areas. An edit operation that modifies image features considered to be more important by the method will provide a larger contribution value than an edit operation that modifies image features considered by the method to be less important. In some implementations, the method can determine whether particular characteristics are present for the edit operation and/or its application to the image, where such particular characteristics may have a predetermined importance value or contribution value. For example, application of the edit operation to particular types of image areas, e.g., depicted image features such as objects, backgrounds, or other image areas, can be known from previous user samples and testing to be more visually important than application to other types of image areas. In one example similar to the example described above, human faces depicted in an image are typically considered more important than other types of depicted objects since most viewers' eyes are attracted to faces. Other particular types of objects may also be generally considered important, e.g., animals, vehicles, etc. (especially when not surrounded by many other same or similar types of objects in the image).

A main subject of an image can also be considered more important than other subjects in the image, e.g., a foreground image feature (e.g., closer to the camera lens) being generally more important than a background image feature (e.g., further from the camera lens). For example, this foreground/background status can be determined based on size of depicted features in the image relative to the entire image area, where larger features may be foreground objects and smaller features may be background objects (similar to the area size characteristic above). In some implementations, depth data (and/or other data) may be available as metadata of the image, and can indicate the distance from the capturing camera lens for each pixel or image area in the image. For example, such depth data can assist determination of foreground features (closer to the camera lens) and background features (further from the camera lens). In some implementations, importance (or foreground/background status) can be based on location of the area affected by the edit operation with respect to the entire image area and/or with respect to predetermined locations in the image. For example, image features located closer to the center of the image may be considered more important or more likely foreground features than image features located closer to the sides and borders of the image, and thus may be considered more important than image features at other locations. Other characteristics can also make image areas important, e.g., color of the pixels in the area (e.g., bright colors or standout colors attract more viewer attention than more faded or dull colors and colors which blend in with other colors appearing over a large image area), texture, shape, edges (e.g., large discontinuities in color between adjacent or nearby pixels, forming a continuous edge), and other characteristics. As described above, some important image features can be detected in the image using image recognition techniques, e.g., object recognition, facial recognition, landscape feature recognition, and other techniques, which in some implementations can compare examined image areas to stored reference patterns of known image feature types.

The contribution value from all the characteristics (and other factors) can be combined (e.g., summed) to obtain the individual impact score for the edit operation. In some implementations, one or more contribution values can be adjusted by a particular weighting factor or value. For example, if some characteristics are considered more important to visual impact than other factors, they can be weighted more strongly (e.g., higher). In some examples, the characteristic of parameter values can be weighted highly compared to other factors since the magnitude of parameter values can directly affect the visual impact of an edit operation. Also or alternatively, such weighting can be inherent in the magnitude or range of contribution values that can be contributed for each factor. In some implementations, a contribution value for a particular factor can be adjusted by a different weight based the particular modification in the factor or based on the values involved in the modification. For example, it may have been previously determined (e.g., via testing of responses by various users or other persons) that changes in brightness in an image have more visual impact if the starting and ending brightness pixel values in the changes occur within a middle range of brightness parameter values, e.g., between values 30 and 60 in a value range of 0-100, as compared to brightness pixel values that occur above or below this middle range. Thus, in some implementations, a change to brightness pixel values occurring within (or overlapping) the middle range can be weighted higher in contribution values for the brightness filter compared to changes in brightness pixel values occurring outside the middle range.

In block 410, the method determines the accumulated impact score for all edit operations performed since the last image (e.g., the most recently added image) was added to the visualization. In the first iteration of block 410, the last image is the input image obtained in block 402. In later iterations, for example, the last image can be a modified image that was most recently added to the visualization (e.g., in block 414, described below). In some implementations, the accumulated impact score can be a combined score that includes all of the of the individual impact scores for all of the edit operations performed since the last image was added to the visualization (e.g., relevant edit operations). In some implementations, the accumulated impact score can be a combined score that includes one or more the of the individual impact scores for one or more of the edit operations performed since the last image was added to the visualization. In some implementations, the accumulated impact score includes a sum of the individual impact scores for those relevant edit operations. In some implementations, the accumulated impact score can be based at least in part on another function that combines those individual impact scores, e.g., an average, median, or a function taking the maximum individual impact score.

In block 412, the method determines whether the accumulated impact score determined in block 410 satisfies a predetermined impact score threshold. In the example shown, it is checked whether the accumulated impact score is greater than the threshold. For example, this threshold can define a particular minimum impact score that indicates a particular amount of visual change in the latest modified image as compared to the last image added to the visualization. The particular amount of visual change is a predetermined amount considered to be sufficiently noticeable by a user so as to allow the latest modified image to be added to the visualization. Other checks or comparisons can be used in other implementations to determine if the accumulated impact score satisfies the impact score threshold.

If the accumulated impact score does not satisfy (e.g., is less than) the impact score threshold, then the method continues to block 416, described below. If the accumulated impact score does satisfy (e.g., is greater than) the impact score threshold, then the method continues to block 414 in which the method adds the current modified image (resulting from block 406) to the visualization. For example, in some implementations, if the visualization is stored as a data structure or list, an identifier for the modified image can be added to the data structure or list to indicate an appropriate position for the modified image after the last image in the visualization sequence. Thus, if the accumulated impact score indicates that the changes in the current modified image are sufficiently visible relative to the last image added to the visualization, then the latest modified image is added to the visualization. This feature permits modified images having sufficiently visible changes to appear in the image visualization, while modified images showing less visible changes will not appear.

In some implementations, the method also creates one or more descriptive labels for the added modified image and stores such labels to be associated with the modified image. For example, the label can describe and/or name the edit operations that were applied to the image since the last added image to indicate to a user the particular modifications made to that image. Other information can also or alternatively be included in the labels, e.g., particular parameter values of the applied edit operations, time that an edit operation was applied, image features recognized in the image and influencing the impact score of an applied edit operation, etc. In various implementations, the labels can be added directly into the image (e.g., changing pixel values of the image). Alternatively, labels can be superimposed over the image as a separate (and removable) graphical layer in a display program, or positioned near to the image in the display of the visualization. The labels can also or alternatively be added to the image as metadata stored in metadata fields of the image or stored in association with the image. In some implementations, the method can check to determine if there are too many labels assigned to a single image in a visualization. If so, the method can designate that only those labels corresponding to the most significant filters be displayed in the visualization. The most significant filters can be determined using the impact scores and contribution values described above and/or other criteria (e.g., the highest such impact scores and/or contribution values).

Some implementations can also add other types of effects to the added modified image. For example, the method can highlight particular areas of the added modified image which were changed by the edit operations applied since the previous image in the visualization. In one example, the highlights can indicate to a user particular image pixels that were modified. Such particular areas can be highlighted in a visible color, texture, outline, border, or other indicator or marker. Other effects can also be added. The method then continues to block 416.

In block 416, the method determines whether there is another edit operation to process in a subsequent iteration of blocks 406-414. For example, multiple edit operations may have been designated to be applied for a particular enhancement process for the input image, and the method can check whether one or more of those edit operations must still be considered (and applied, if appropriate). If there are one or more edit operations to process, the method returns to block 406 to apply the next edit operation (or select the next modified image to which the next edit operation was applied). If there are no further edit operations, the method continues to block 418.

In block 418, the method determines whether the accumulated impact score does not satisfy (e.g., is less than) the impact score threshold. At this stage, no further edit operations are left to be processed in the above blocks, and so the method checks to see how visually different the last modified image is compared to the image previous to that last modified image in the visualization (e.g., the penultimate image). If the accumulated impact score satisfies (e.g., is greater than) the threshold, then the method continues to block 424, described below.

If the accumulated impact score does not satisfy (e.g., is less than) the threshold, then in block 420 the method removes the last image in the visualization. For example, this block can be performed so that the final image in the visualization (added below in block 422) will not be too visibly similar to the previous (penultimate) image in the visualization (which the current accumulated impact score indicates might be the case). The method then continues to block 422.

In block 422, the method adds the last modified image to the visualization as the final image (if appropriate). For example, since the accumulated impact score did not satisfy the threshold, one or more of the last applied edit operations were not included in the visualization, and so the last modified image resulting from the last iteration of block 406 is added as the final image.

In block 424, the method adds final labels to the final image in the visualization. For example, labels and/or other effects can be added similarly as described above for block 414. In some examples, labels (e.g., "output image" or "final image") can be associated with the final image of the visualization. Other modifications can also or alternatively be added to the final image, e.g., highlights of the modifications made, a frame around the borders of the final image, or other effect.

In some implementations, block 418 can be omitted and blocks 422 and 424 can be performed in reverse sequence to the sequence shown in FIG. 4. For example, the method can always remove the last image in the visualization, add labels to the last modified image, and then add the labelled image to the visualization as the final visualization image.

In block 426, the method provides the visualization for display. This block can be performed at any time, and can include storing the visualization on an accessible storage device for access by another process of a system, e.g., a loading or display process and/or sending the visualization for display on a display device of the system or a different system. For example, the stored visualization can include the visualization images, any labels or other effects, and information describing the visualization sequence.

In various examples, the visualization can present the visualization images simultaneously in a horizontal row, a vertical column, or a combination of row(s) and column(s). For example, a row or column can present the visualization images in a sequence indicating the corresponding sequence of modifications applied to the input image and successive modified images. In some implementations, a single visualization image can be displayed at a time (or a subset of the images can be displayed at one time), followed by removing the image from the display and displaying a next visualization image in the modification sequence or a next subset of images. For example, the visualization images can be presented as video frames in a displayed video sequence (e.g., movie data or animated GIF image) that is the same as the modification sequence, where each visualization image is displayed for a predetermined amount of time. A movie can be created to include additional frames presenting progress of edit operations being applied. Some video sequences can include special effects, e.g., different types of fades, dissolves, or other transitions between sequential images. In another visualization example, a single visualization image can be displayed, and a user can select one or more user input controls (e.g., a right arrow or a left arrow of a hardware control or displayed graphical control) to display a corresponding next or previous visualization image in the sequence of visualization images. In some implementations, the first and/or last images in the visualization can be displayed at a larger size or otherwise visually distinguished from intermediate images in the visualization.

In block 430, the method determines the total impact score for all edit operations performed relative to the input image. For example, the total impact score can be a combination of all the individual impact scores for the applied edit operations. In some examples, the combination can be a sum of the individual impact scores, and/or can be based on some other function, e.g., an average, median, or maximum function. In some implementations, one or more of the individual impact scores can be weighted differently and contribute different amounts to the total impact score based on their weights. For example, individual impact scores associated with particular types of edit operations can be weighted higher than individual scores associated with other types of edit operations, similarly as described above for block 408. The presence of other characteristics described above for block 408 cause the associated individual impact score to be weighted greater in the determination of the total impact score. For example, in some implementations, the method can weight higher the individual impact scores that are associated with edit operations having one or more characteristics providing a large contribution value (e.g., over a predetermined threshold value) to their individual impact scores as determined in block 408.

In block 432, the method determines a visual quality of the final modified image. Any of a variety of techniques can be used by the method (and/or by other accessible methods) to evaluate the quality of the final modified image. In some cases, some or all of the image characteristics used to determine visual quality can be different than the factors and characteristics used to determine visual impact. For example, image characteristics including exposure level, noise level or profile, and sharpness/blurriness level of the final modified image can be evaluated to determine quality. In one example, an exposure score can be determined for the final modified image, where a better exposed image receives a better (e.g., higher) score. A noise profile score can also be estimated, where a less noisy image (e.g., image having less color noise) receives a better (e.g., higher) score. A sharpness score can also be determined, where a sharper image receives a better (e.g., higher) score. The scores can be summed to obtain an overall visual quality score indicating an overall visual quality of the final modified image. In other implementations, an overall visual quality score can be determined by evaluating additional and/or alternative characteristics of the final modified image. Some implementations can determine an overall visual quality score for the original input image instead of the final modified image. For example, a visual quality of the input image can be evaluated and visual quality score determined by a different process before the method 400 is performed, where the method 400 obtains the overall visual quality score from that process.

In block 434, the method combines the total impact score and the overall visual quality score to obtain a ranking score. In one example, the two scores can be summed, and/or another one or more functions used to combine the scores. For example, the combination of impact score and visual quality score can reduce the chance of a lower-quality image having a high ranking score. Some implementations can omit the use of visual quality score in determining the ranking score for an image.

In block 436, the method determines a visual impact ranking of the final modified image with respect to one or more other, different images that have had a ranking score determined (e.g., based on modifications to those images and visual quality of those images similarly as described above). Similarly as described above with reference to FIG. 2, the method can compare the ranking score determined in block 430 with ranking scores associated with the other images to determine the ranking of the final modified image. This ranking can thus be based on the visual quality as well as the visual impact of modifications made to the image. In some examples, the final modified image having the highest ranking score can be assigned the highest rank, followed by the final modified image having the next highest ranking score, etc.

It should be noted that the blocks described in the methods of FIGS. 2-4 can be performed in a different order than shown and/or simultaneously (partially or completely) with other blocks, where appropriate. In some implementations, blocks can occur multiple times, in a different order, and/or at different times in the methods. For example, the impact scores of block 408 can be determined at a variety of times in various implementations. The impact scores can be determined at the same time an input image is processed and modified by edit operations, can be determined in advance of image modification (e.g., when parameters of upcoming edit operations can be estimated), or can be determined after the image was modified based on saved values of parameters and any other needed stored information describing the edit operation(s).

In some implementations, the input image can be part of a video sequence of images, e.g., a frame in a sequence of video frames. For example, the method can determine impact scores for each of multiple frames of the video sequence. Some implementations can determine a total impact score for the entire video sequence of images, e.g., as a function of impact scores of individual edit operations applied to single frames. Alternatively, some edit operations may be multi-frame edit operations that are applied to multiple frames of a video. The method can determine an individual impact score for each multi-frame edit operation, and a total impact score for the video sequence can be a function of multi frame filter scores or a function of both single-frame and multi-frame filter scores.

In some implementations, different versions of an input image can be used to determine the impact scores and ranking of the input image, and/or different versions can be used in the visualization. For example, the "image" processed in the methods herein can be a version of an input image. For example, an input image can be downscaled or upscaled to a version that has different size and/or pixel resolution (e.g., a preview image or thumbnail image), and the impact scores can be determined based on the scaled input image. In some implementations, such scaled versions of the input image can be the basis for the visualization images added to the visualization instead of using the actual input image.

In some implementations, a system can provide a recommendation or selection of one or more edit operations based on visual impact of the edit operations determined as described herein. For example, a visual impact edit threshold can be predetermined, and/or can be specified by a user, e.g., via a user interface, stored user preferences, etc., to specify a desired visual impact. The recommendation or selection by the system can be based on whether the individual impact scores of edit operations satisfy the visual impact edit threshold, e.g., whether an edit operation provides (or does not provide) the desired visual impact. In some implementations, a user can input different parameters to an edit operation, the system determines the visual impact on an input image, and the system outputs an indication of the visual impact of the edit operation on the input image. In some implementations, the user can input one or more different parameters to the edit operation to further determine visual impact of the edit operation on the input image or on a modified image.

In some implementations, based on the determined visual impact of a particular edit operation, the system can recommend or disapprove the particular edit operation for future use in modifying images, e.g., via visual displayed output. In some implementations, based on visual impact of the edit operations, a system can determine which edit operations of the one or more edit operations are to be retained and applied to create the output image as described in FIGS. 2-4 and which of the one or more edit operations are to be disregarded and not applied to create the output image. For example, in an initial test to determine impact scores, the system can apply the one or more edit operations to the image and determine individual impact scores as described herein, and compare the resulting individual impact score of each edit operation to the visual impact edit threshold. Edit operations that have an individual impact score satisfying the visual impact edit threshold (e.g., qualifying edit operations) can be retained and edit operations that have an individual impact score not satisfying the visual impact edit threshold can be disregarded. For example, only the qualifying edit operations can be applied to the image to create the output image. In various implementations, a score satisfying the visual impact edit threshold can be a score greater than the threshold, less than the threshold, in a range defined by multiple thresholds, etc. In some implementations, the retained edit operations can be the edit operations that produce modified images that qualify for inclusion in the visualization as described above with reference to FIGS. 3 and 4.

In some examples, a system can test the application of multiple types of edit operations on an image and use the resulting impact scores determined in any of the methods described herein to recommend or select one (or more) of the edit operations having a desired visual effect on the image. For example, an edit operation can be selected having the highest individual impact score, lowest individual impact score, etc. of multiple tested edit operations. In some examples, the modified image resulting from the selected edit operation can be retained and included in the visualization while modified images resulting from other tested edit operations can be discarded or ignored.

In some implementations, the one or more edit operations can be applied to the image in one or more different orders and impact scores can be determined for each order applied. In some cases or implementations, a different total impact score may result depending on the order of application of the edit operations to the image. Some implementations can test multiple different orders of application of the edit operations and can recommend or select an order of edit operations providing a desired visual effect on the image. For example, an order of application providing the highest total impact score out of the tested orders of application can be selected as the desired order of edit operations to be applied to the image.

In some implementations, the methods of FIGS. 2, 3, and/or 4 can apply edit operations, determine total impact scores, and/or determine visualizations for one or more portions of an image, where a portion can be an area of the image less than the entire area of the image. For example, the portion can be a predetermined area with a predetermined size and/or shape (e.g., square or circular regions), or can be an area determined based on one or more detected features in the image, such as color edges, an outline of a detected object, face, or other recognized feature, etc. In some examples, block 206 of FIG. 2 can determine individual impact scores for edit operations applied to a particular portion of the image, and block 208 of FIG. 2 can determine an overall degree of visual impact on (and/or total impact score for) that particular portion of the image. A total impact score can be determined for each modified portion of the image, e.g., multiple impact scores determined for multiple portions of the same image.

Some implementations can apply the one or more edit operations to the entire image, and determine individual impact scores for those edit operations indicative of degrees of visual impact of the edit operations to a particular portion of the image. A total impact score can also be determined for that particular portion. Other portions in the image can similarly be associated with individual impact scores and a total impact score. Thus the impact of an edit operation applied to the entire image can be determined for one or more particular image portions. For example, an edit may affect different portions of the image differently. Some implementations can test multiple types of edit operations on an image and use this impact information from different image portions, for example, to select one (or more) of the edit operations having a desired effect on the image portions for actual application to the image. For example, edit operation(s) can be selected having the highest mean total impact score based on the total impact scores determined in multiple image portions, or the lowest mean total impact score, highest or lowest variance between total impact scores in different regions (e.g., to vary brightness or contrast throughout an image), etc.

Similarly, some implementations of FIGS. 3 and 4 can provide visualizations that include displayed indications of the modified portion(s) of the image (e.g., where the modified portion(s) are highlighted in a particular color or shading, are outlined, or are otherwise indicated). In some implementations, a single visualization can highlight multiple modified portions in each modified image included in the visualization. Some implementations can provide a different and/or separate visualization for each modified portion of an image.

In some implementations, the methods 200, 300, and 400 can be implemented, for example, on a server system (e.g., server system 102 shown in FIG. 1). In some implementations, one or more client devices (e.g., client devices shown in FIG. 1) can perform one or more blocks instead of or in addition to a server system performing those blocks. For example, an image can be modified or enhanced by edit operations on a client device and impact scores can be determined on a server device, or vice versa.

Methods described herein (e.g., methods 200, 300, and/or 400) can be implemented by program instructions or code, which can be executed on a computer. For example, the code can be implemented by one or more processors (e.g., microprocessors or other processing circuitry), and can be stored on a computer program product including a non-transitory computer readable medium (e.g., storage medium), e.g., a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system). Alternatively, one or more methods can be implemented in hardware (logic gates, etc.), or in a combination of hardware and software. One or more methods can be performed as part of or component of an application running on the system, or as an application or software running in conjunction with other applications and operating system.

Figure 5:
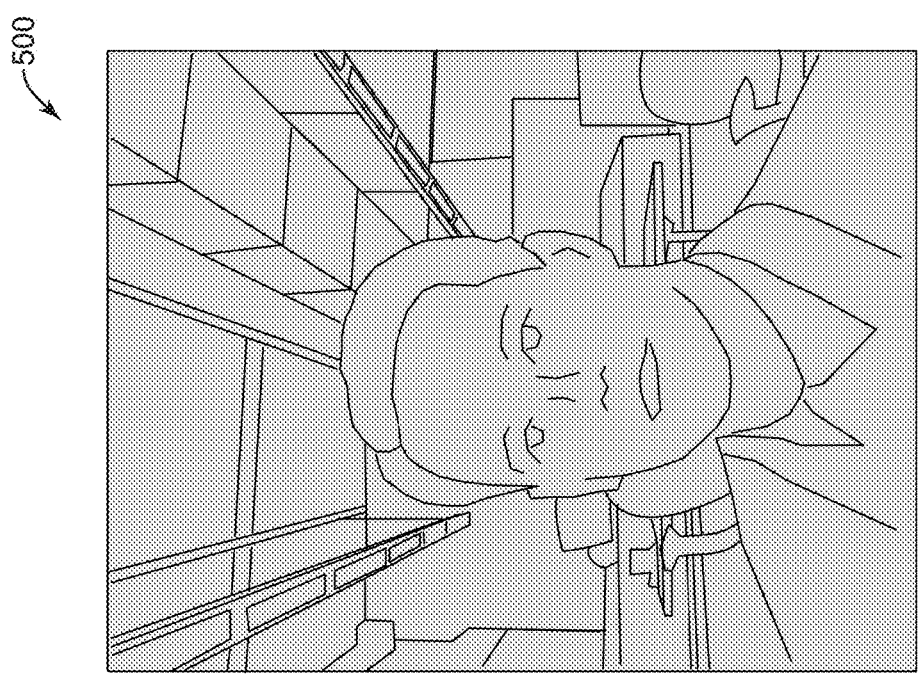

FIG. 5 is a diagrammatic illustration of an example input image 500 that can be processed using one or more features described herein. In various implementations, image 500 can be displayed on a display device, e.g., of a client device 120, 122, 124, and/or 126 of FIG. 1, or a server system 102 in some implementations. In some implementations, the input image 500 can be processed as described herein without being displayed, or can be displayed after all processing is complete, e.g., in a visualization. In one example, a user can view images shown in FIGS. 5-9 displayed in a graphical user interface by a display device of a client device. Images 500, 600, 700, 800, and 900 are shown as line drawings in FIGS. 5-9 for explanatory purposes to represent images with pixels, including images that have had various edit operations applied.

Methods and systems described above can receive input image 500 and process modified images shown below that are originally derived from image 500. For example, a method that measures impact of image modifications and/or determines a visualization of image modifications can apply the edit operations to obtain the modified images below, and/or can receive one or more of these modified images that have had edit operations applied by other methods or systems, as well as receive information describing the edit operations performed. In the examples of FIGS. 5-10, method 400 can be used to measure image modifications and determine a visualization of the image modifications.

Input image 500 is added to a visualization created for the image 500, and is the first image in the visualization. Furthermore, in this example, input image 500 is analyzed by a system that can perform an automatic enhancement to the image to improve quality. The automatic enhancement involves the application of one or more edit operations which are applied to the image if the system determines such edit operations are needed based on analyzing the image. In this described example, the system determines that input image 500 should be modified with a number of edit operations applied in a particular sequence as described in FIGS. 6-9. In the example modified images of FIGS. 6-9, shown modifications are approximated in line drawings and may be exaggerated in magnitude for explanatory purposes.

In some implementations, the system can refer to indirect user input (e.g., stored user preferences or settings) to guide the evaluation and application of edit operations, e.g., to the image 500. For example, user-specified thresholds may have been previously input. In other implementations, some or all of the edit operations can be determined and/or instructed manually by a user with direct user input (e.g., instructing particular edit operations with particular parameters to be performed, in a displayed image editing program or other interface, for example) instead of automatically being performed by a system without direct user input.

Figure 6:
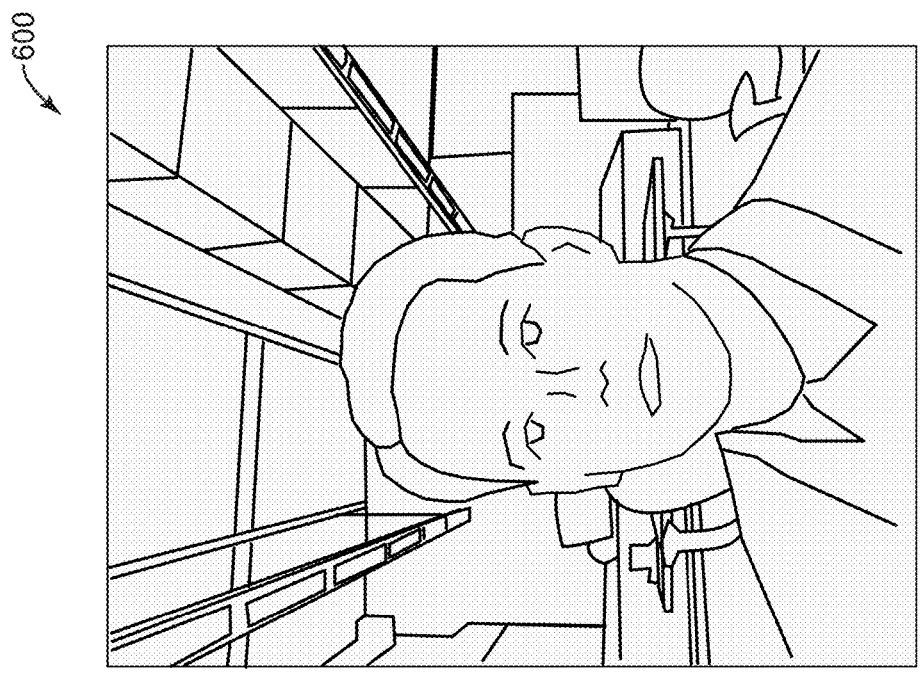
FIGS. 5-9 are diagrammatic illustrations of example images processed using one or more features described herein.

FIG. 6 shows an example modified image 600 resulting from the application of an edit operation to input image 500. In this example, the system has applied an edit operation that includes a brightness filter, contrast filter, and saturation filter to provide the modified image 600. The method 400 can then evaluate the modified image 600 to determine its visual impact, e.g., determine an individual impact score for that edit operation. (In other implementations, each of these filters can be considered its own individual edit operation, so that an individual impact score can be determined for each filter.) The method can determine the individual impact score for the edit operation based on factors. Factors can include characteristics such as, for example, the type of edit operation (e.g., brightness can have a strong visual impact), magnitudes of parameters used by the edit operation (small magnitudes applied in this case), percentage of image area modified by the edit operation (e.g., the whole image, in this case), and importance of modified image areas (e.g., important areas are affected in this case, such as a face as detected in the image using one or more facial recognition techniques). To determine an accumulated impact score, the system combines (e.g., sums) individual impact scores for edit operations performed since the last image was added to the visualization, which in this case only involves the individual impact score for this edit operation. In this example, the system finds that the accumulated impact score is above (e.g., satisfies) the impact score threshold, and so the modified image 600 is added to the visualization as the second visualization image after the first image 500.

Figure 7:
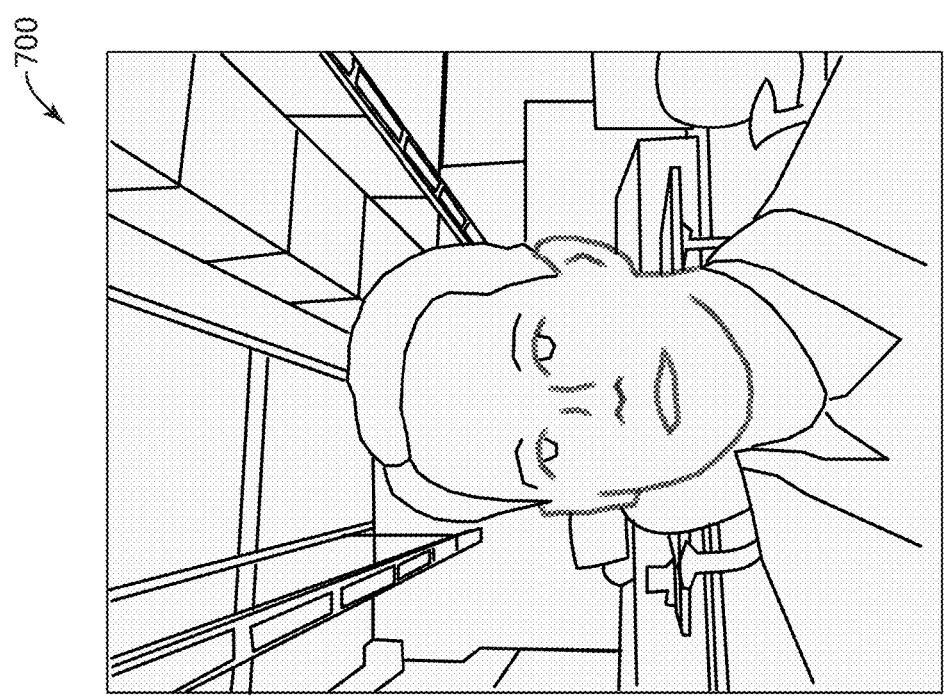

FIG. 7 shows an example modified image 700 resulting from the application of a next edit operation in sequence to the modified image 600. In this example, the system has applied an edit operation that includes a skin softening filter to provide the modified image 700, e.g., a blurriness added to facial features (approximated with grey facial lines in FIG. 7). The method can determine the impact score for the edit operation based on factors that can include the type of edit operation (e.g., skin softening which has a high visual impact since it affects a face), magnitude of parameters used (low magnitude in this example), percentage of image area affected (e.g., just the face area in this example), and importance of modified image areas (e.g., important areas such as the face were affected in this example). The method 400 then combines (e.g., sums) individual impact scores for edit operations performed since the last image was added to the visualization, which in this case only involves the individual impact score for this skin softening edit operation. The method finds that the accumulated impact score is above the impact score threshold, and so the modified image 700 is added to the visualization as the third visualization image positioned after the second image 600 in a visualization sequence.

Figure 8:
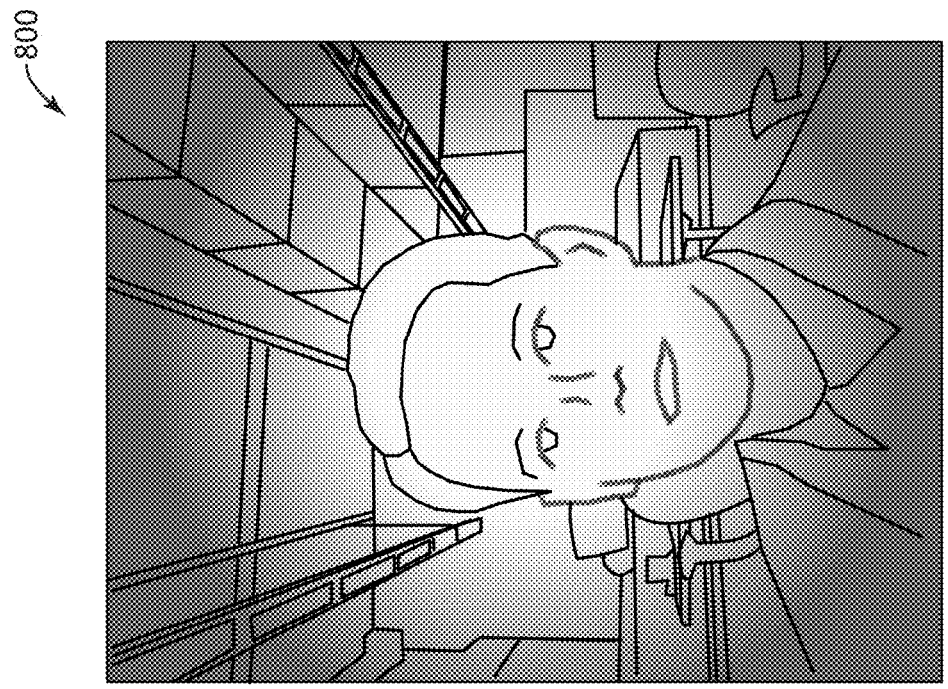

FIG. 8 shows an example modified image 800 resulting from the application of multiple edit operations in sequence to modified image 700. In this example, the system has applied multiple edit operations including a sharpness filter applied to modified image 700 at a low parameter magnitude, and then a color filter applied to the sharpened image at a low parameter setting to remove a small amount of detected color cast. These edit operations are each evaluated to find individual impact scores, e.g., based on one or more factors similarly as described above. In this example, the impact score of the sharpness filter is below the impact score threshold and so its resulting associated modified image is not added to the visualization. In the next iteration (e.g., of blocks 406-416 of FIG. 4), the accumulated impact score includes the impact score of the sharpness filter plus the impact score of the color filter. In this example, this accumulated impact score is still below the impact score threshold, so the modified image resulting from application of the color filter is also not added to the visualization.

In the next iteration, the system applies an edit operation including a vignette filter to the latest modified image resulting from application of the color filter. The resulting image is modified image 800. The method can determine the impact score for this edit operation based on factors that can include the type of edit operation (e.g., vignette in this case, which may not have a high visual impact since it does not affect a face directly), magnitude of parameters used (in this case, high magnitude parameters to darken the image border areas significantly), percentage of image area affected (e.g., in this case, much of the image around the face), and importance of modified image areas (e.g., unimportant areas such as the border areas are affected in this case). The method 400 then combines (e.g., sums) individual impact scores for edit operations performed since the last image was added to the visualization to determine the accumulated impact score, which in this case involves the individual impact scores for the sharpness filter, the color filter, and the vignette filter. The method finds that the accumulated impact score is above the impact score threshold, and so the modified image 800 is added to the visualization as the fourth visualization image after the third image 700.

Figure 9:

FIG. 9 shows an example modified image 900 that is the final image added to the visualization. In this example, no further edit operations were applied to the last modified image 800 resulting from the vignette filter described for FIG. 8, so image 800 is the final image of the visualization. In some implementations, the method can add one or more labels to the image 800, such as the example label 902 shown in FIG. 9, to create image 900 which, in some implementations, can be stored in place of image 800 as the final image of the visualization.

In some implementations, the system can determine a total impact score for the final modified image based on the individual impact scores for all the edit operations applied as described above. In some implementations, the total impact score can be combined with an overall quality score of the image 800 (or image 900) to determine a ranking score that is compared with ranking scores similarly determined for other images to determine a ranking of the final modified image 800 or 900 with reference to rankings of the other images.

Figure 10:
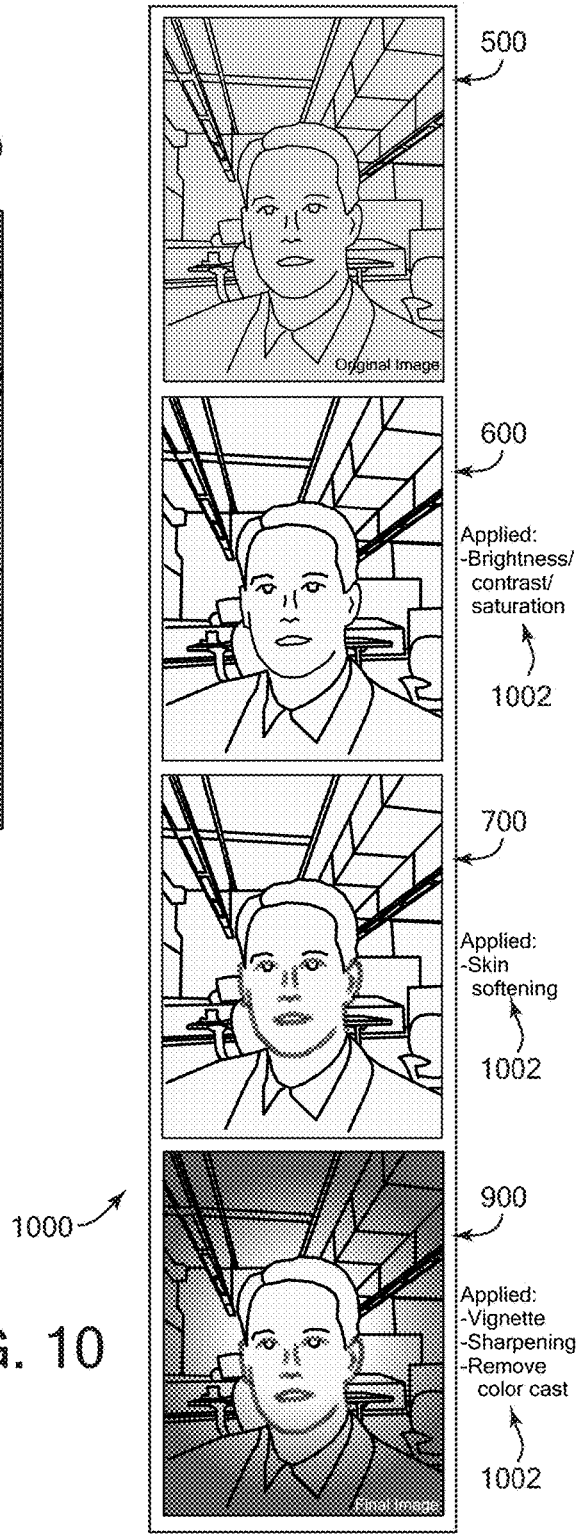
FIG. 10 is a diagrammatic illustration of an example visualization based on the images of FIGS. 5-9.

FIG. 10 shows an example of a displayed visualization 1000 in which visualization images are presented simultaneously in a vertical column. The images 500 (with label added), 600, 700, and 900 are shown in the sequential order in which they were produced by the sequentially-applied edit operations. Example labels have also been added in association with some of the images. In this example, the first and last images in the sequence include the labels "original image" and "final image," respectively. In addition, labels 1002 have each been added to one side of an associated one of the last three images in the sequence to indicate which edit operation(s) were applied since the previous image in the sequence to obtain the associated image. This can allow a user to view the changes made to the image by an automatic modification process and/or by a user manually instructing edit operations to an image. Other implementations can present the visualization images in a row or other configuration (box, diagonal line, etc.). Some implementations can display only one or a subset of the visualization images at a time, and present the other visualization images automatically over time or in response to input of a user viewing the visualization, e.g., display the visualization images in a time sequence.

In some implementations, the total impact score, and/or a message based on the total impact score, can be displayed as part of the visualization (e.g., near the final image of the visualization, etc.). In some implementations, the ranking of the output image can be displayed as part of the visualization, e.g., displayed as a ranking number indicating the ranking. A description of a set of images in which the ranking applies can also be displayed, e.g., a set of images of a user's collection, a set of images uploaded by users to a network service in a particular time frame, etc.

Figure 11:
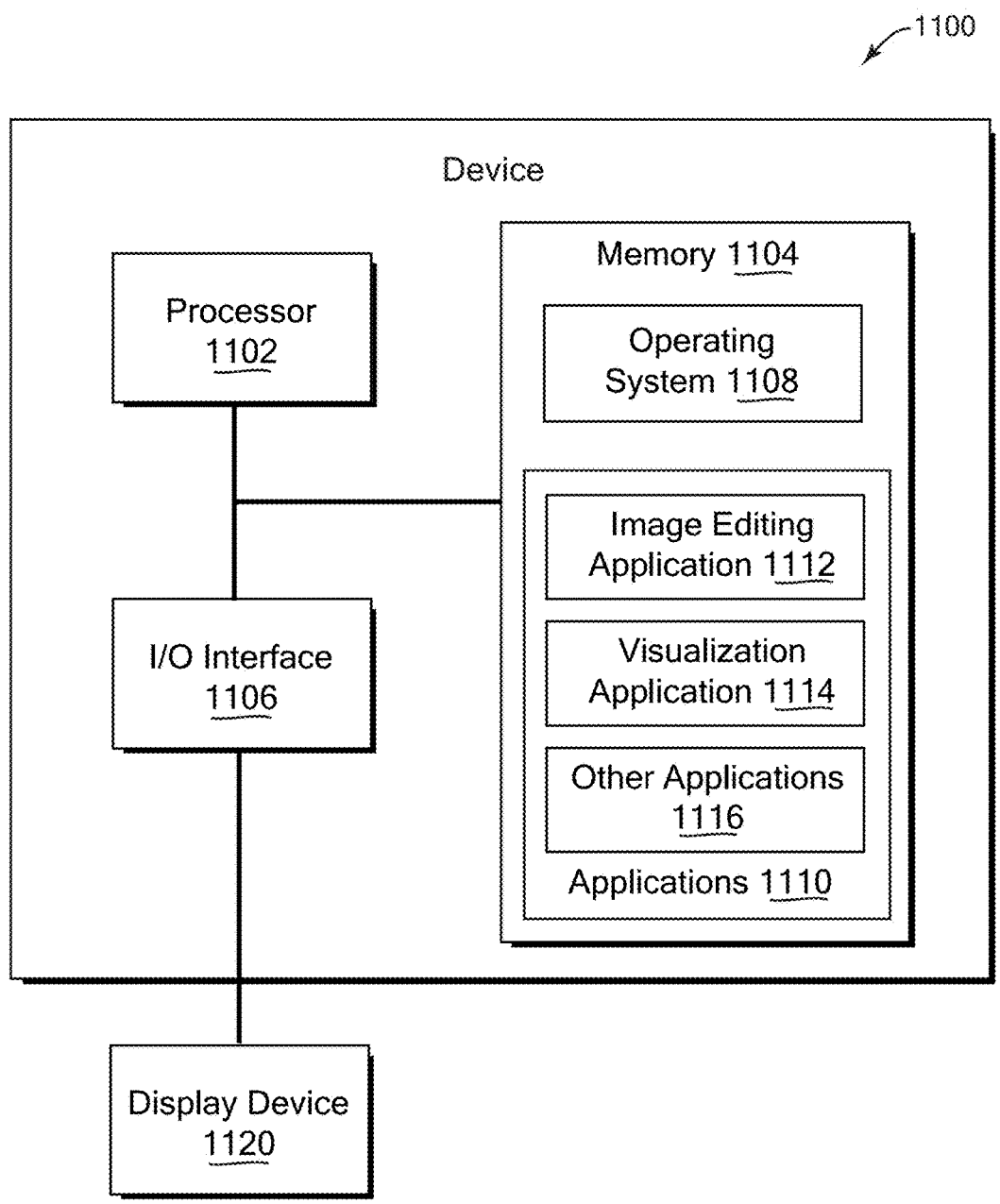
FIG. 11 is a block diagram of an example device which may be used for one or more implementations described herein.

FIG. 11 is a block diagram of an example device 1100 which may be used to implement some implementations described herein. In some implementations, device 1100 may be used to implement a server device, e.g., server device 104 of FIG. 1, and perform appropriate method implementations described herein. Server device 1100 can be any suitable computer system, server, or other electronic or hardware device. For example, the server device 1100 can be a mainframe computer, desktop computer, workstation, portable computer, or electronic device (portable device, cell phone, smart phone, tablet computer, television, TV set top box, personal digital assistant (PDA), media player, wearable device, game device, etc.). In some implementations, server device 1100 includes a processor 1102, a memory 1104, and input/output (I/O) interface 1106.

Processor 1102 can be one or more processors or processing circuits to execute program code and control basic operations of the device 1100. A "processor" includes any suitable hardware and/or software system, mechanism or component that processes data, signals or other information. A processor may include a system with a general-purpose central processing unit (CPU), multiple processing units, dedicated circuitry for achieving functionality, or other systems. Processing need not be limited to a particular geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 1104 is typically provided in device 1100 for access by the processor 1102, and may be any suitable processor-readable non-transitory storage medium, e.g., random access memory (RAM), read-only memory (ROM), Electrical Erasable Read-only Memory (EEPROM), Flash memory, etc., suitable for storing instructions for execution by the processor, and located separate from processor 1102 and/or integrated therewith. Memory 1104 can store software operating on the server device 1100 by the processor 1102, including an operating system 1108 and one or more applications 1110, e.g., a graphics editing engine, web hosting engine, social networking engine, etc. In some implementations, the applications engines 1110 can include instructions that enable processor 1102 to perform functions described herein, e.g., some or all of the methods of FIGS. 2, 3, and 4. For example, applications 1110 can include one or more image editing applications 1112 providing edit operations that are applied to images automatically and/or based on user input. Visualization application 1114 can be operative to display image visualizations including modified images on a display device as described herein. An image editing application and/or visualization application, for example, can provide a displayed user interface responsive to user input to perform edit operations, display images, and display visualizations with selected options. Other applications or engines 1116 can also or alternatively be included in applications 1110, e.g., graphics applications, communication applications, web hosting engine or application, social networking engine or application, etc. Any of software in memory 1104 can alternatively be stored on any other suitable storage location or computer-readable medium. In addition, memory 1104 (and/or other connected storage device(s)) can store images, visualizations, edit operation sequences and parameters, data structures, and other instructions and data used in the features described herein. Memory 1104 and any other type of storage (magnetic disk, optical disk, magnetic tape, or other tangible media) can be considered "storage devices."

I/O interface 1106 can provide functions to enable interfacing the server device 1100 with other systems and devices. For example, network communication devices, storage devices (e.g., memory and/or database 106), and input/output devices can communicate via interface 1106. In some implementations, the I/O interface can connect to interface devices including input devices (keyboard, pointing device, touchscreen, microphone, camera, scanner, etc.)

and/or output devices (display device, speaker devices, printer, motor, etc.). A display device 1120 is one example of an output device that can be used to display content, e.g., input and modified images and/or images included in a visualization as described herein. Display device 1120 can be connected to device 1100 via local connections (e.g., display bus) and/or via networked connections and can be any suitable display device, some examples of which are described below.

For ease of illustration, FIG. 11 shows one block for each of processor 1102, memory 1104, I/O interface 1106, and software blocks 1108 and 1110. These blocks may represent one or more processors or processing circuitries, operating systems, memories, I/O interfaces, applications, and/or software modules. In other implementations, server device 1100 may not have all of the components shown and/or may have other elements including other types of elements instead of, or in addition to, those shown herein. While system 102 is described as performing blocks and operations as described in some implementations herein, any suitable component or combination of components of system 102 or similar system, or any suitable processor or processors associated with such a system, may perform the blocks and operations described.

A client device can also implement and/or be used with one or more features described herein, e.g., any of client devices 120-126 shown in FIG. 1. Example client devices can include some similar components as the device 1100, e.g., processor(s) 1102, memory 1104, and I/O interface 1106. An operating system, software and applications suitable for the client device can be provided in memory and used by the processor, e.g., image editing software, client group communication application software, etc. The I/O interface for a client device can be connected to network communication devices, as well as to input and output devices, e.g., a microphone for capturing sound, a camera for capturing images or video, audio speaker devices for outputting sound, a display device for outputting images or video, or other output devices. A display device 1120, for example, can be used to display images per- and post-processing as described herein, where such device can include any suitable display device, e.g., an LCD, LED, or plasma display screen, CRT, television, monitor, touchscreen, 3-D display screen, or other visual display device. Some implementations can provide an audio output device, e.g., voice output or synthesis that speaks text.

One or more methods described herein can be run in a standalone program that can be run on any type of computing device, a program run on a web browser, a mobile application ("app") run on a mobile computing device (e.g., cell phone, smart phone, tablet computer, wearable device (wristwatch, armband, jewelry, headwear, goggles, glasses, etc.), laptop computer, etc.). In one example, a client/server architecture can be used, e.g., a mobile computing device (as a client device) sends user input data to a server device and receives from the server the final output data for output (e.g., for display). In another example, all computations can be performed within the mobile app (and/or other apps) on the mobile computing device. In another example, computations can be split between the mobile computing device and one or more server devices.

Although the description has been described with respect to particular implementations thereof, these particular implementations are merely illustrative, and not restrictive. Concepts illustrated in the examples may be applied to other examples and implementations.

In situations in which the systems discussed here may collect personal information about users, or may make use of personal information, users may be provided with an opportunity to control whether programs or features collect user information (e.g., information about a user's social network, user characteristics (age, gender, profession, etc.), social actions or activities, a user's preferences, or a user's current location). In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, a user may have control over how information is collected about the user and used by a server.

Note that the functional blocks, operations, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed, e.g., procedural or object-oriented. The routines may execute on a single processing device or multiple processors. Although the steps, operations, or computations may be presented in a specific order, the order may be changed in different particular implementations. In some implementations, multiple steps or operations shown as sequential in this specification may be performed at the same time.

What is claimed is:

1. A computer-implemented method to indicate impact of image modification, the method comprising:
    applying a first edit operation to a first image, wherein applying the first edit operation includes modifying one or more pixels of the first image to provide a first modified image;
    applying a second edit operation to the first modified image, wherein applying the second edit operation includes modifying one or more pixels of the first modified image to provide a second modified image;
    determining a first impact score associated with the first edit operation and indicative of a degree of visual change in the first image caused by applying the first edit operation;
    determining a second impact score associated with the second edit operation and indicative of a degree of visual change in the first modified image caused by applying the second edit operation;
    determining that the first impact score and second impact score each satisfy an impact score threshold, wherein the satisfying of the impact score threshold indicates a greater degree of visual image change than a minimum degree of visual image change associated with the impact score threshold;
    providing the first modified image and the second modified image in a visualization of image modification for the first image in response to the first impact score and second impact score each satisfying the impact score threshold; and
    causing the visualization to be displayed by a display device.

2. The method of claim 1 wherein the visualization provides display of a progression of sequential changes made by sequential modifications by the first and second edit operations.

3. The method of claim 1 further comprising:
determining an overall degree of visual impact on the first image caused by the first and second edit operations based on combining the first and second impact scores into a total impact score; and
providing an indication of the determined overall degree of visual impact to the first image in the visualization, wherein the indication is based on a comparison of the total impact score with a plurality of predefined ranges of scores, each predefined range associated with a different amount of visual change.

4. The method of claim 1 further comprising determining a ranking of the second modified image, wherein the ranking is determined with respect to a plurality of other images, and wherein the ranking is based on the first and second impact scores of the first and second edit operations.

5. The method of claim 4 wherein determining the ranking of the second modified image further comprises determining the ranking based on a visual quality score of the second modified image, wherein the visual quality score is based on at least one of: an exposure level of the second modified image, a noise level of the second modified image, and a sharpness level of the second modified image.

6. The method of claim 1 wherein the visualization includes one or more displayed highlights that visually indicate particular image pixels of at least one of the first modified image and the second modified image that were changed by at least one of the first edit operation and the second edit operation.

7. The method of claim 1 wherein determining the first impact score is based on a type of the first edit operation, wherein the type of the first edit operation is one of a plurality of types of edit operations, and wherein each type of edit operation is associated with a corresponding contribution to the first impact score, wherein each type of edit operation that changes only pixels of one or more faces depicted in the first image contributes a larger impact score than each type of edit operation that changes pixels of the one or more faces and at least one non-facial pixel in the first image.

8. The method of claim 1 wherein determining the first impact score is based on applying the first edit operation to the first image with one or more parameter values, wherein the first impact score is based on a magnitude of modification provided by the first edit operation as determined by the one or more parameter values.

9. The method of claim 1 wherein determining the first impact score is based on applying the first edit operation to modify pixels in an affected area of the first image, wherein the affected area has a size, and wherein the first impact score is based on the size of the affected area of the first image with respect to an entire area of the first image.

10. The method of claim 1 wherein determining the first impact score is based on applying the first edit operation to modify pixels in an affected area of the first image, wherein the first impact score is based on a location of the affected area with respect to a border of the first image.

11. The method of claim 1 further comprising:
determining a recommendation of whether to apply the first edit operation to one or more other images, wherein the recommendation is based on the first impact score; and
causing the recommendation to be output by the display device.

12. The method of claim 1 wherein the visualization includes one or more text labels that describe at least one of the first edit operation and second edit operation.

13. The method of claim 1 wherein providing the visualization for display by a display device includes displaying the first image, the first modified image, and the second modified image in a sequence corresponding to a sequence of applying the first and second edit operations.

14. The method of claim 1 wherein the visualization includes at least one of:
a simultaneous display of the first image and the first and second modified images; and
a sequential display in time of the first image, the first modified image, and the second modified image.

15. A system to indicate impact of image modification, the system comprising:
a storage device; and
at least one processor operative to access the storage device and configured to:
obtain a first image;
apply a first edit operation to the first image to generate a first modified image, wherein applying the first edit operation includes modifying one or more pixels of the first image to provide the first modified image;
apply a second edit operation to the first modified image to generate a second modified image, wherein applying the second edit operation includes modifying one or more pixels of the first modified image to provide the second modified image; and
determine a first impact score associated with the first edit operation and a second impact score associated with the second edit operation, wherein the first impact score is indicative of a degree of visual change in the first image caused by applying the first edit operation and the second impact score is indicative of a degree of visual change in the first modified image caused by the second edit operation;
determine that the first impact score and second impact score each satisfy an impact score threshold, wherein the satisfying of the impact score threshold indicates a greater degree of visual image change than a minimum degree of visual image change associated with the impact score threshold;
determine to include the first modified image and the second modified image in a displayable visualization in response to the first impact score and second impact score satisfying the impact score threshold; and
provide the displayable visualization that includes the first image, the first modified image, and the second modified image.

16. The system of claim 15 wherein the at least one processor is further configured to:
determine a ranking of the second modified image, wherein the ranking is determined with respect to a plurality of other images, and wherein the ranking is based on the first and second impact scores of the first and second edit operations, wherein determining the ranking of the second modified image further comprises determining the ranking based on a visual quality score of the second modified image.

17. The system of claim 16 wherein the first impact score is based on applying the first edit operation to modify pixels in an affected area of the first image and is based on at least one of:

a size of the affected area of the first image to which the first edit operation is applied with respect to an entire area of the first image; and a location of the affected area with respect to a border of the first image.

18. A non-transitory computer readable medium having stored thereon instructions to indicate impact of image modification that, when executed by a processor, cause the processor to:

apply two or more edit operations to modify an image including a first edit operation that modifies one or more pixels of the image to provide a first modified image and a second edit operation that modifies one or more pixels of the first modified image to provide a second modified image;

determine two or more individual impact scores for the respective edit operations, wherein the two or more individual impact scores are each indicative of a degree of visual image change caused by the respective edit operations, including a first impact score associated with the first edit operation and indicative of a degree of visual change in the image caused by applying the first edit operation and a second impact score associated with the second edit operation and indicative of a degree of visual change in the first modified image caused by applying the second edit operation;

determine that the first impact score and second impact score each satisfy an impact score threshold, wherein satisfaction of the impact score threshold indicates a greater degree of visual image change than a minimum degree of visual image change associated with the impact score threshold;

determine, based on the two or more individual impact scores, a visualization that indicates the modification of the image by the two or more edit operations; and provide the visualization for display by a display device.

19. The computer readable medium of claim 18 wherein the instructions further cause the processor to:

combine the two or more individual impact scores into a total impact score to determine an overall degree of visual impact of the two or more edit operations with respect to the image; and provide an indication of the determined overall degree of visual impact in the visualization.

20. The computer readable medium of claim 18 wherein the first impact score is based on applying the first edit operation to modify pixels in an affected area of the image and is based on at least one of:

a size of the affected area of the image to which the first edit operation is applied with respect to an entire area of the image; and a location of the affected area with respect to borders of the image.

* * * * *